United States Patent
Iovanna et al.

(10) Patent No.: US 11,652,730 B2
(45) Date of Patent: May 16, 2023

(54) SELECTIVE PROCESSING OF TRAFFIC FLOWS BASED ON LATENCY REQUIREMENTS

(71) Applicant: Telefonaktiebolaget LM Ericsson (publ), Stockholm (SE)

(72) Inventors: Paola Iovanna, Pisa (IT); Guilio Bottari, Pisa (IT); Jacob Österling, Stockholm (SE); Filippo Ponzini, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 170 days.

(21) Appl. No.: 16/318,233

(22) PCT Filed: Aug. 23, 2016

(86) PCT No.: PCT/EP2016/069913
§ 371 (c)(1),
(2) Date: Jan. 16, 2019

(87) PCT Pub. No.: WO2018/036620
PCT Pub. Date: Mar. 1, 2018

(65) Prior Publication Data
US 2019/0173775 A1    Jun. 6, 2019

(51) Int. Cl.
*H04L 45/122* (2022.01)
*H04W 88/08* (2009.01)
(Continued)

(52) U.S. Cl.
CPC ..... *H04L 45/122* (2013.01); *H04B 10/25752* (2013.01); *H04L 41/5087* (2013.01);
(Continued)

(58) Field of Classification Search
CPC ... H04L 41/50–5096; H04L 43/08–087; H04L 45/12–128; H04L 45/16;
(Continued)

(56) References Cited

U.S. PATENT DOCUMENTS 7,180,865 B1 * 2/2007 Taylor ................ H04L 41/0813
                                                            370/241
7,200,148 B1 * 4/2007 Taylor ................ H04L 41/147
                                                            370/395.1
(Continued)

FOREIGN PATENT DOCUMENTS

JP        5684137 B2      1/2015
WO    2010054122 A1      5/2010
(Continued)

OTHER PUBLICATIONS

J. Liu, S. Xu, S. Zhou and Z. Niu, "Redesigning fronthaul for next-generation networks: beyond baseband samples and point-to-point links," in IEEE Wireless Communications, vol. 22, No. 5, pp. 90-97, Oct. 2015, doi: 10.1109/MWC.2015.7306542. (Year: 2015).*
(Continued)

*Primary Examiner* — Mohamed A. Wasel
(74) *Attorney, Agent, or Firm* — Murphy, Bilak & Homilier, PLLC

(57) ABSTRACT

An intermediate node (203) for a transport network (200) is configured such that traffic flows between at least one remote access node (201) and a central hub node (202) pass via the
(Continued)

US 11,652,730 B2
Page 2 intermediate node (203). The intermediate node (203) is configured to selectively process a traffic flow depending on a responsiveness requirement of the traffic flow.

19 Claims, 15 Drawing Sheets

(51) Int. Cl.
| | |
|---|---|
| H04L 41/50 | (2022.01) |
| H04W 88/12 | (2009.01) |
| H04W 92/12 | (2009.01) |
| H04B 10/2575 | (2013.01) |
| H04L 47/80 | (2022.01) |
| H04W 28/02 | (2009.01) |
| H04W 80/02 | (2009.01) |

(52) U.S. Cl.
CPC ......... *H04L 47/80* (2013.01); *H04W 28/0247* (2013.01); *H04W 80/02* (2013.01); *H04W 88/085* (2013.01); *H04W 88/12* (2013.01); *H04W 92/12* (2013.01)

(58) Field of Classification Search
CPC ..... H04L 45/22–245; H04L 47/70–829; H04L 67/12–125; H04L 67/32–327; H04L 5/0062; H04L 5/0032–0035; H04L 45/122; H04L 47/80; H04B 10/25752–25759; H04W 4/02–029; H04W 28/02–14; H04W 36/24–32; H04W 80/00–12; H04W 84/00–22; H04W 88/00–16; H04W 92/00–24; H04W 28/0247; H04W 80/02; H04W 88/085
See application file for complete search history.

(56) References Cited

U.S. PATENT DOCUMENTS

| | | | | |
|---|---|---|---|---|
| 7,391,739 B1* | 6/2008 | Taylor | ................. | H04L 43/0829 370/246 |
| 9,236,942 B1* | 1/2016 | Roberds | ............... | H04B 10/291 |
| 9,735,940 B1* | 8/2017 | Bakr | ................. | H04B 7/0408 |
| 10,014,910 B2* | 7/2018 | Boldi | .................... | H04B 7/022 |
| 10,547,511 B2* | 1/2020 | Ellis | .................... | H04L 12/4641 |
| 2002/0003641 A1* | 1/2002 | Hall | ........................ | H04J 14/06 398/65 |
| 2003/0005122 A1* | 1/2003 | Freimuth | ................ | H04L 67/16 709/225 |
| 2003/0078074 A1* | 4/2003 | Sesay | ............... | H04B 10/25754 455/561 |
| 2003/0180046 A1* | 9/2003 | Veith | ............... | H04B 10/25137 398/54 |
| 2003/0181212 A1* | 9/2003 | Wentink | ................ | H04L 47/522 455/450 |
| 2004/0030797 A1* | 2/2004 | Akinlar | ................... | H04L 47/10 709/232 |
| 2004/0136373 A1* | 7/2004 | Bareis | ................ | H04L 47/2416 370/392 |
| 2007/0085623 A1* | 4/2007 | Staszewski | ............. | H04L 27/368 331/182 |
| 2007/0253332 A1* | 11/2007 | Fawaz | ................ | H04L 47/2475 370/230 |
| 2008/0056167 A1* | 3/2008 | Kim | ................. | H04B 10/25759 370/294 |
| 2009/0175279 A1* | 7/2009 | Gao | ........................ | H04L 67/24 370/395.21 |
| 2009/0285577 A1* | 11/2009 | Yu | ....................... | H04J 14/0298 398/79 |
| 2009/0296577 A1* | 12/2009 | Gusat | .................. | H04L 43/0864 370/230.1 |
| 2010/0272063 A1* | 10/2010 | Kato | ..................... | H04W 8/082 370/331 |
| 2011/0129222 A1* | 6/2011 | Karol | .................. | H04J 14/0269 398/58 |
| 2011/0135300 A1* | 6/2011 | Oyane | ................... | H04W 56/00 398/25 |
| 2012/0045211 A1* | 2/2012 | Tan | ........................ | H04J 3/1664 398/66 |
| 2012/0208584 A1* | 8/2012 | Liao | ....................... | H04B 17/12 455/509 |
| 2012/0236916 A1* | 9/2012 | Kobayashi | .......... | H04L 27/2662 375/224 |
| 2013/0017852 A1* | 1/2013 | Liu | ..................... | H04W 88/085 455/507 |
| 2013/0031335 A1* | 1/2013 | Santosuosso | ........... | G06F 15/17 712/30 |
| 2013/0064386 A1* | 3/2013 | Yerrace | .................. | H04R 5/033 381/79 |
| 2013/0083656 A1* | 4/2013 | Wigell | .................... | H04L 47/12 370/230 |
| 2013/0089336 A1* | 4/2013 | Dahlfort | ............. | H04J 14/0282 398/115 |
| 2013/0129347 A1* | 5/2013 | Shin | ........................ | H04J 3/065 398/25 |
| 2013/0170353 A1* | 7/2013 | Liu | .................... | H04W 72/0486 370/235 |
| 2013/0337843 A1* | 12/2013 | Fix | ........................ | H04W 24/08 455/456.5 |
| 2014/0031049 A1* | 1/2014 | Sundaresan | ......... | H04W 84/042 455/447 |
| 2014/0036679 A1* | 2/2014 | Cherian | .................. | H04L 47/32 370/235 |
| 2014/0071954 A1* | 3/2014 | Au | ..................... | H04W 28/0205 370/336 |
| 2014/0161447 A1* | 6/2014 | Graves | ............... | H04Q 11/0062 398/48 |
| 2014/0286256 A1 | 9/2014 | Chowdhury et al. | | |
| 2014/0328178 A1* | 11/2014 | Haberland | ............ | H04W 28/08 370/235 |
| 2014/0341569 A1* | 11/2014 | Choi | ................... | H04B 10/0795 398/37 |
| 2014/0348074 A1* | 11/2014 | Lu | ......................... | H04W 28/16 370/329 |
| 2015/0063373 A1* | 3/2015 | Savaglio | ............... | H04W 88/08 370/466 |
| 2015/0180676 A1* | 6/2015 | Bao | .................... | H04W 28/0236 370/230 |
| 2015/0237421 A1* | 8/2015 | Morgan | ............. | H04J 14/0217 398/45 |
| 2015/0365934 A1* | 12/2015 | Liu | ........................ | H04L 5/0039 370/329 |
| 2016/0006615 A1* | 1/2016 | Laraqui | ............... | H04L 41/0886 398/49 |
| 2016/0029205 A1* | 1/2016 | Sirotkin | ............... | H04W 24/02 455/418 |
| 2016/0112925 A1* | 4/2016 | Qin | ................. | H04W 36/00837 370/332 |
| 2016/0198293 A1* | 7/2016 | Mitsuze | ............... | H04L 41/0654 455/456.1 |
| 2016/0218892 A1* | 7/2016 | Lida | ................. | H04L 25/03885 |
| 2016/0241468 A1* | 8/2016 | Sabella | ................. | H04J 14/021 |
| 2016/0277067 A1* | 9/2016 | Lida | ................. | H04B 1/0475 |
| 2016/0277126 A1* | 9/2016 | Lida | ........................ | H04B 1/38 |
| 2016/0277127 A1* | 9/2016 | Lida | ................. | H04L 25/03885 |
| 2016/0285721 A1* | 9/2016 | Lida | ................. | H04L 25/03885 |
| 2016/0295579 A1* | 10/2016 | Pham | ................ | H04W 72/085 |
| 2016/0308641 A1* | 10/2016 | Zeng | ................ | H04B 10/25753 |
| 2016/0353462 A1* | 12/2016 | Jiang | ..................... | H04W 72/10 |
| 2016/0373208 A1* | 12/2016 | Liu | ........................ | H04B 1/40 |
| 2016/0373283 A1* | 12/2016 | Zeng | ................. | H04L 27/2623 |
| 2016/0373360 A1* | 12/2016 | Frydman | ................ | H04L 47/22 |
| 2017/0019802 A1* | 1/2017 | Ode | ........................ | H04W 16/32 |
| 2017/0026904 A1* | 1/2017 | Ode | ........................ | H04W 48/18 |
| 2017/0026965 A1* | 1/2017 | Ode | ................... | H04W 72/0446 |
| 2017/0069207 A1* | 3/2017 | Ma | ........................ | G08G 1/162 |
| 2017/0142598 A1* | 5/2017 | Fang | ................... | H04W 72/042 |
| 2017/0156044 A1* | 6/2017 | Meredith | ............... | H04W 4/029 |

(56) References Cited

U.S. PATENT DOCUMENTS

| | | | | |
|---|---|---|---|---|
| 2017/0163342 | A1* | 6/2017 | Testa | H04L 49/602 |
| 2017/0237495 | A1* | 8/2017 | Lee | H04J 14/02 |
| | | | | 398/79 |
| 2017/0238335 | A1* | 8/2017 | Checko | H04L 43/106 |
| | | | | 370/329 |
| 2017/0245030 | A1* | 8/2017 | Lyubomirsky | H04B 10/07953 |
| 2017/0257151 | A1* | 9/2017 | Lange | H04W 72/0446 |
| 2017/0272365 | A1* | 9/2017 | Wei | H04W 40/04 |
| 2017/0289987 | A1* | 10/2017 | Seok | H04W 72/0406 |
| 2017/0325128 | A1* | 11/2017 | Bhattacharjee | H04L 41/044 |
| 2017/0353237 | A1* | 12/2017 | Johansson | H04B 10/0795 |
| 2018/0013581 | A1* | 1/2018 | Fertonani | H04L 27/26 |
| 2018/0014214 | A1* | 1/2018 | Arena | H04L 43/04 |
| 2018/0020026 | A1* | 1/2018 | Lantz | H04L 65/1069 |
| 2018/0020365 | A1* | 1/2018 | Xiong | H04W 88/02 |
| 2018/0034574 | A1* | 2/2018 | Cavaliere | H04J 3/1652 |
| 2018/0152861 | A1* | 5/2018 | Giraldo Rodriguez | |
| | | | | H04W 24/02 |
| 2018/0227847 | A1* | 8/2018 | Butt | H04W 52/0216 |
| 2018/0234875 | A1* | 8/2018 | Leroudier | H04L 25/02 |
| 2018/0242167 | A1* | 8/2018 | Bottari | H04W 88/08 |
| 2018/0332617 | A1* | 11/2018 | Zeng | H04W 74/0808 |
| 2019/0007503 | A1* | 1/2019 | Zmijewski | H04L 43/0864 |
| 2019/0014479 | A1* | 1/2019 | Iovanna | H04W 16/10 |
| 2019/0098519 | A1* | 3/2019 | Liu | H04W 56/0015 |
| 2019/0104031 | A1* | 4/2019 | Garcia-Saavedra | H04L 45/02 |
| 2019/0124648 | A1* | 4/2019 | Sun | H04W 28/08 |
| 2019/0124662 | A1* | 4/2019 | Berg | H04W 72/0453 |
| 2019/0173775 | A1* | 6/2019 | Iovanna | H04L 41/5087 |
| 2019/0320324 | A1* | 10/2019 | Guan | H04W 16/18 |
| 2020/0113016 | A1* | 4/2020 | Sevindik | H04W 88/085 |
| 2020/0195352 | A1* | 6/2020 | Cavaliere | H04B 10/5167 |
| 2020/0296749 | A1* | 9/2020 | Freda | H04W 28/0268 |
| 2020/0344635 | A1* | 10/2020 | Lu | H04W 88/10 |
| 2020/0389535 | A1* | 12/2020 | Zmijewski | H04L 43/0852 |

FOREIGN PATENT DOCUMENTS

| | | |
|---|---|---|
| WO | 2015094256 A1 | 6/2015 |
| WO | 2016045716 A1 | 3/2016 |

OTHER PUBLICATIONS

F. Musumeci, C. Bellanzon, N. Carapellese, M. Tornatore, A. Pattavina and S. Gosselin, "Optimal BBU Placement for 5G C-Ran Deployment Over WDM Aggregation Networks," in Journal of Lightwave Technology, vol. 34, No. 8, pp. 1963-1970, 15 Apr. 15, 2016, doi: 10.1109/JLT.2015.2513101. (Year: 2015).*

M. Hadzialic, B. Dosenovic, M. Dzaferagic and J. Musovic, "Cloud-RAN: Innovative radio access network architecture," Proceedings ELMAR-2013, Zadar, 2013, pp. 115-120. (Year: 2013).*

H. Holm, A. Checko, R. Al-obaidi and H. Christiansen, "Optimal assignment of cells in C-RAN deployments with multiple BBU pools," 2015 European Conference on Networks and Communications (EuCNC), Paris, 2015, pp. 205-209, doi: 10.1109/EuCNC. 2015.7194069. (Year: 2015).*

N. Carapellese, M. Tornatore and A. Pattavina, "Energy-Efficient Baseband Unit Placement in a Fixed/Mobile Converged WDM Aggregation Network," in IEEE Journal on Selected Areas in Communications, vol. 32, No. 8, pp. 1542-1551, Aug. 2014, doi: 10.1109/JSAC.2014.2335071. (Year: 2014).*

Carapellese, Nicola. "BaseBand unit hotelling architectures for fixed-mobile converged next-generation access and aggregation networks." (2015). (Year: 2015).*

B. Schrenk, T. Lorünser and T. Zemen, "Towards spectrum-programmable, mesh-enabled mobile xHaul through reconfigurable WDM overlay in fully-passive networks," 2015 17th International Conference on Transparent Optical Networks (ICTON), Budapest, Hungary, 2015, pp. 1-4, doi: 10.1109/ICTON.2015.7193593. (Year: 2015).*

Carapellese, Nicola, et al., "Energy-Efficient Baseband Unit Placement in a Fixed/Mobile Converged WDM Aggregation Network", IEEE Journal on Selected Areas in Communications, vol. 32, No. 8, Aug. 2014, pp. 1542-1551.

"Transport Network Support of IMT-2020/5G", ITU-T Technical Report; Telecommunication Standardization Sector of ITU; GSTR-TN5G, Feb. 9, 2018, pp. 1-21.

* cited by examiner

SELECTIVE PROCESSING OF TRAFFIC FLOWS BASED ON LATENCY REQUIREMENTS

TECHNICAL FIELD

The present disclosure relates to a transport network, node and method for communication of traffic flows, and in particular a transport network, node and method for communication of traffic flows depending on the different responsiveness requirements, or latency requirements, of the traffic flows.

BACKGROUND

A transport network is an important aspect for enabling future fifth generation, 5G, network deployments. The transport network will be under demand to support current and future radio access technologies (RATs), along with the various schemes of radio functions.

Based on the radio architectures, it is possible to define many deployment scenarios ranging from fully centralized architectures, for example a Cloud Radio Access Network (CRAN), to a more conventional scenario in which all functions are replicated at each radio site using monolithic radio base stations (RBSs).

FIGS. 1a and 1b illustrate two network architectures. FIG. 1a is based on a single ring where some nodes are used for connecting radio clusters, for example nodes 101 and 102 for connecting Remote Radio Units (RRUs), while other nodes, for example nodes 103 and 104, are used for connecting both radio clusters and baseband clusters, such as Remote Radio Units (RRUs) and Baseband Units (BBUs). In some aspects a radio cluster may be a plurality of radio units, e.g. RRUs, at a single site. In some aspects a baseband cluster may be a plurality of baseband processing units at a single site or pool. The baseband processing for the radio units in nodes 101,102 may be carried out by nodes 103,104.

FIG. 1b is based on a central hub 105 dedicated to hosting BBUs, the central hub 105 also acting as head of a series of rings used to reach sparse radio clusters, for example clusters of RRUs.

A challenge for transport networks is to address the conflicting requirements from operators for reduction of number of sites whilst also complying with the stringent 5G requirements on bandwidth and latency.

As of yet, the transport network has not been considered as a bottleneck for radio functions, especially given that radio has been mainly the source of Ethernet clients, typically originating in monolithic RBSs. In these scenarios, there are no latency critical transmissions and therefore the distance between the nodes is not particularly limited.

Transport links will be expected to support the very high bandwidth and strict latency requirements for the 5G connection flows. In particular, Common Public Radio Interface (CPRI) traffic, or other traffic originated in the CRAN environment, can be characterized by stringent latency needs, thus limiting the maximum distance imposed for transport. This is especially the case over radio access technologies relating to a flexible air interface for 5G, known as 5G-Nx, where the maximum distance between radio and baseband nodes can be limited to a few kilometers.

As described herein, the term "xHaul" is used as a term to indicate a common network and infrastructure integrating both the fronthaul and backhaul segments with all their wire and wireless technologies in a common transport network. It is noted that the term xHaul is also intended to embrace other terms used to represent such a network, for example "anyhaul", "newhaul" or "omnihaul". Networks such as xHaul are evolving to include wireline traffic, and they are expected in the future to support whatever will be required to be transported between radio antenna and baseband processing nodes. In such xHaul networks, where all the traffic shares the same transport infrastructure, bounding the distance between nodes to the most stringent one in terms of the latency requirements mentioned earlier would be extremely penalizing for the non-latency critical traffic, i.e. traffic flows that do not have responsiveness requirements, for example the Ethernet traffic. The xHaul network may use wired and/or wireless technologies.

SUMMARY

It is an aim of the present disclosure to provide a method and apparatus which obviate or reduce at least one or more of the disadvantages mentioned above.

According to a first aspect there is provided an intermediate node for a transport network. The intermediate node is configured such that traffic flows between at least one remote access node and a central hub node pass via the intermediate node. The intermediate node is configured to selectively process a traffic flow depending on a responsiveness requirement of the traffic flow.

According to another aspect there is provided a transport network for communicating traffic flows having different responsiveness requirements. The transport network comprises at least one remote access node, a central hub node and a first intermediate node. The at least one remote access node and the central hub node are connected to transmit traffic flows between the at least one remote access node and the central hub node via the first intermediate node. The first intermediate node is configured to selectively process a traffic flow depending on a responsiveness requirement of the traffic flow.

According to another aspect there is provided a central hub node for a transport network. The central hub node is configured to transmit traffic flows between at least one remote access node and the central hub node via an intermediate node. The central hub node is configured to discard a received unprocessed traffic flow for a traffic flow associated with one of the at least one remote access node having a responsiveness requirement. The central hub node is configured to process a received traffic flow for a traffic flow associated with one of the at least one remote access node not having a responsiveness requirement.

According to another aspect there is provided a method of providing a transport network. The method comprises providing at least one remote access node, providing a central hub node, and providing an intermediate node. The method comprises transmitting traffic flows between the at least one remote access node and the central hub node via the intermediate node. The method comprises selectively processing the traffic flows in the intermediate node depending on a responsiveness requirement of the traffic flow.

According to another aspect there is provided a method of baseband processing in an intermediate node. The method comprises providing the intermediate node such that traffic flows between at least one remote access node and a central hub node pass via the intermediate node. The method comprises selectively processing a traffic flow depending on a responsiveness requirement of the traffic flow.

According to another aspect there is provided a method of providing a transport network. The method comprises providing at least one remote access node for receiving xHaul traffic, providing a central hub for transmitting and receiving xHaul traffic at a first distance from the at least one remote access node, providing an intermediate node for transmitting traffic flows between the at least one access node and the central hub node via the intermediate node. The method comprises determining whether a type of traffic flow will require processing at the intermediate node depending on whether the responsiveness requirements for the type of traffic flow requires a smaller distance between nodes than the first distance. The method comprises determining the smallest distance required between nodes by multiple types of traffic flow, and providing the intermediate node at a distance smaller than or equal to the smallest distance required.

BRIEF DESCRIPTION OF THE DRAWINGS

For a better understanding of the present disclosure, and to show how it may be put into effect, reference will now be made, by way of example, to the accompanying drawings, in which.

DESCRIPTION

Figure 1:
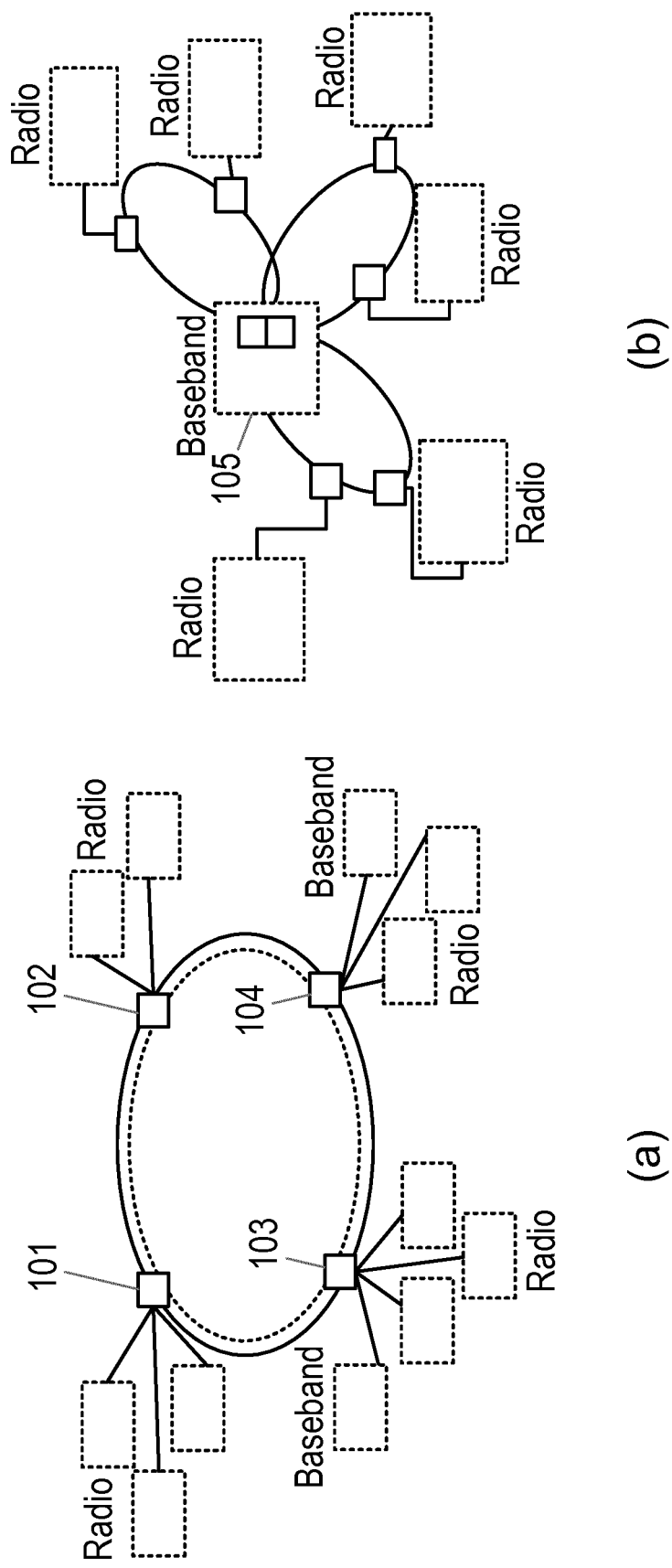
FIGS. 1a and 1b illustrate first and second network architectures.

The present disclosure relates to a transport network and nodes for communicating traffic flows in the transport network, depending on the different responsiveness requirements or latency requirements of the traffic flows.

As mentioned earlier, the term "xHaul" is used herein as a term to indicate a common network and infrastructure integrating both the fronthaul and backhaul segments with all their wire and wireless technologies in a common transport network. It is noted that the term xHaul is also intended to embrace other terms used to represent such a network, for example "anyhaul", "newhaul" or "omnihaul".

The embodiments described herein refer to a "responsiveness requirement" of a traffic flow. This expression is intended to define whether a traffic flow requires a response within a certain time period, and as such whether a traffic flow has a latency dependence, which may also be referred to as a latency requirement. A responsiveness requirement or latency dependency is intended to cover any form of delay that may affect a traffic flow, including for example processing operations performed on the traffic flows, such as baseband (BB) processing of an air interface, and other delays that may be introduced over a transport chain, including the length or distance between nodes.

The embodiments described herein may relate to traffic flows of any type carrying radio data. The RAN architecture according to examples may separate the analogue radio communication functionalities and the digital baseband processing functionalities into two separate entities, e.g. termed a Remote Radio Unit (RRU) and Digital Unit (DU) or Baseband processing unit (BBU) respectively. The RRU and DU/BBU are connected by an interface configured to pass digital signals providing the radio signals received or for transmission. For example, the radio signals are in the form of I/Q data. The radio data may be a digitized version of the radio signal for transmission/received. The communication of the radio data may be referred to as fronthaul. An interface may be employed to enable equipment from different vendors to be interconnected. An example for communication among RRUs and DUs/BBUs is the Common Public Radio Interface (CPRI). An alternative interface is Open Base Station Architecture Initiative (OBSAI). Alternatively, the radio data may be transmitted between the RRU and DU/BBU using a packet interface, i.e. the radio data is contained in packets (i.e. may be packet switched). Such data may be referred to as evolved CPRI traffic flows, 5G-CPRI traffic flows, or CPRI+ traffic flows, or other low latency packet interface traffic flows.

As will be described in further detail below, the embodiments described herein have an advantage of preserving the advantages of a shared xHaul transport network, without confining the geographical reach to what would otherwise be imposed by the most latency sensitive traffic, transporting radio traffic over an air interface e.g. of 5G, for example 5G-Nx. For the sake of simplicity, only two levels of centralization are specifically described in the embodiments herein, i.e. one intermediate node and a central node. However, it is noted that further levels may be utilized, e.g. one or more intermediate node and/or one or more central node.

Figure 2:
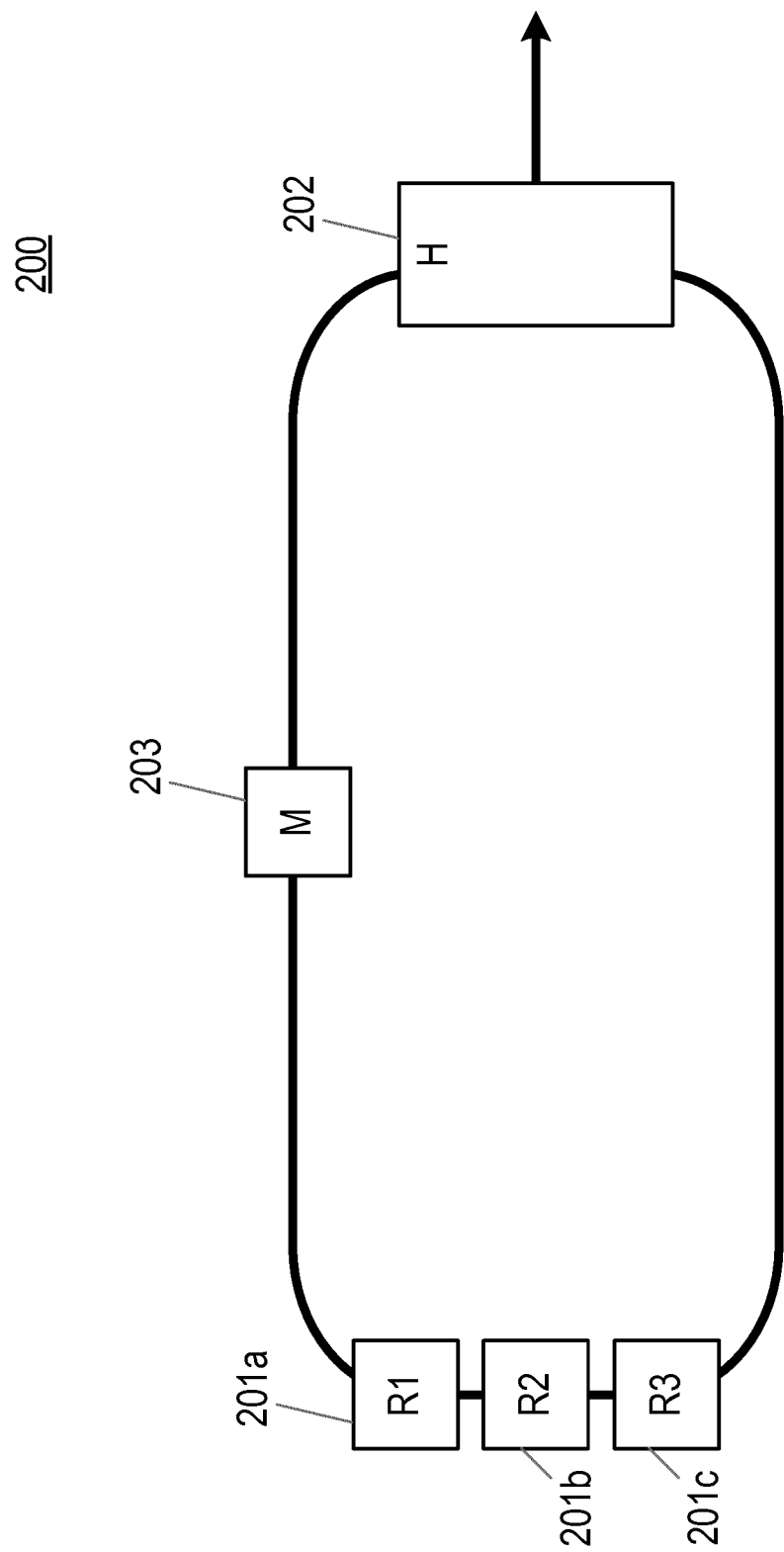
FIG. 2 illustrates a transport network for communicating traffic flows having different latency requirements according to an embodiment.

FIG. 2 illustrates a transport network 200 according to an embodiment, for communicating traffic flows having different responsiveness requirements. The transport network 200 comprises at least one remote access node 201, illustrated by three remote access nodes 201a, 201b and 201c. The transport network 200 also comprises a central hub node 202, and a first intermediate node 203.

The at least one remote access node 201 and the central hub node 202 are connected to transmit traffic flows between the at least one remote access node 201 and the central hub node 202 via the first intermediate node 203.

The remote access nodes 201 may comprise the entry points of the transport network 200 for traffic flows, including for example Ethernet traffic, Common Public Radio Interface (CPRI) traffic, or any future interface. A traffic flow between nodes may comprise a plurality of individual traffic flows. A traffic flow may be provided on a plurality of optical channels, for example whereby each optical channel transports an individual traffic flow, and whereby the traffic flows are possibly framed to convey a mix of heterogeneous clients.

The first intermediate node 203 is configured to selectively process a traffic flow depending on a responsiveness requirement of the traffic flow. For example, the intermediate node 203 may be configured to selectively process a traffic flow depending on whether the traffic flow requires that the distance between nodes is less than the distance between said at least one remote access node 201 and the central hub node 202. The responsiveness requirement may also take account of the time taken by a processing unit to process a traffic flow. The first intermediate node may be as described with reference to any of FIG. 4 to 8, 12 or 13 below.

The radio data may relate to user data, also referred to as user plane data. The radio data may be considered as carried in a traffic flow. A traffic flow may be considered as relating to data for a single user equipment, UE. The UE may alternatively be referred to as a wireless terminal, end device, wireless device, mobile telephone, laptop or other device connected to the radio access network. In some examples, the traffic flow may be considered for only some layers of a communication protocol stack. For example, the traffic flow may refer to communication on the air interface on Layer 2, or only on Layer 2. In some examples, the traffic flow may be considered as a flow at the Media Access Control (MAC) layer and/or Radio Link Control (RLC) layer. In further examples, the traffic flow may be considered as a flow including other layers, e.g. higher layers such as Packet Data Convergence Protocol (PDCP). The first intermediate node 203 is configured to selectively process a traffic flow at a certain layer(s)/protocol(s).

The traffic flows for different UEs may be aggregated within the radio access network, e.g. in the transport network between the remote access node 201 and the central hub node 202, optionally via the first intermediate node 203. Such aggregated traffic flows may be aggregated according to destination (e.g. the intermediate node 203), such that the aggregated traffic flow can be terminated and the whole channel, e.g. an optical channel processed in the same way. Alternatively, the aggregated traffic flow may be terminated by extracting the traffic flow to be terminated at a particular node (e.g. intermediate node 203), and the remaining traffic flows also terminated or allowed to bypass processing at the particular node.

The responsiveness requirements put on the single user flow (i.e. single UE flow) will be inherited by the transport network channel or aggregated traffic flow, i.e. the transport network channel is pushed in (all directions) by its included single user flows. Thus one can talk about a latency requirement on a transport network channel, which originates from a single user flow responsiveness requirement.

In some examples, latency critical traffic is extracted at the intermediate node 203, baseband processed, and forwarded towards the central hub node 202. The forwarded data may be forwarded using any suitable protocol. In some examples, Ethernet (IEEE 802.3) is used to carry the baseband processed data. References to use of Ethernet is for example only, and any other technology may be used to carry baseband processed data, e.g. any packet switched technology. In some examples, the forwarding towards to the central hub node 202 is by reusing one or more optical channels. In some examples, the intermediate node 203 may reuse the same optical channel upon which a particular traffic flow was received at the intermediate node, to forward the Ethernet traffic towards the central hub node 202 after it has been processed at the intermediate node 203. For example, latency critical traffic is extracted at the intermediate node 203 and baseband processed in the intermediate node 203. The baseband processed data, e.g. Ethernet traffic, is forwarded towards the central hub node 202. In some embodiments, the same optical channels are used for both radio data (i.e. before baseband processing) and baseband processed data.

By selectively processing a traffic flow according to the responsiveness requirements of the traffic flow, this removes the need to move nodes closer in order to deal with the most critical latency dependent traffic. Put another way, the distance between a remote access node 201 and a central hub node 203 can be increased beyond the distance that would otherwise be imposed by the most latency critical traffic, yet still allow latency dependent traffic to be handled.

Figure 3A:
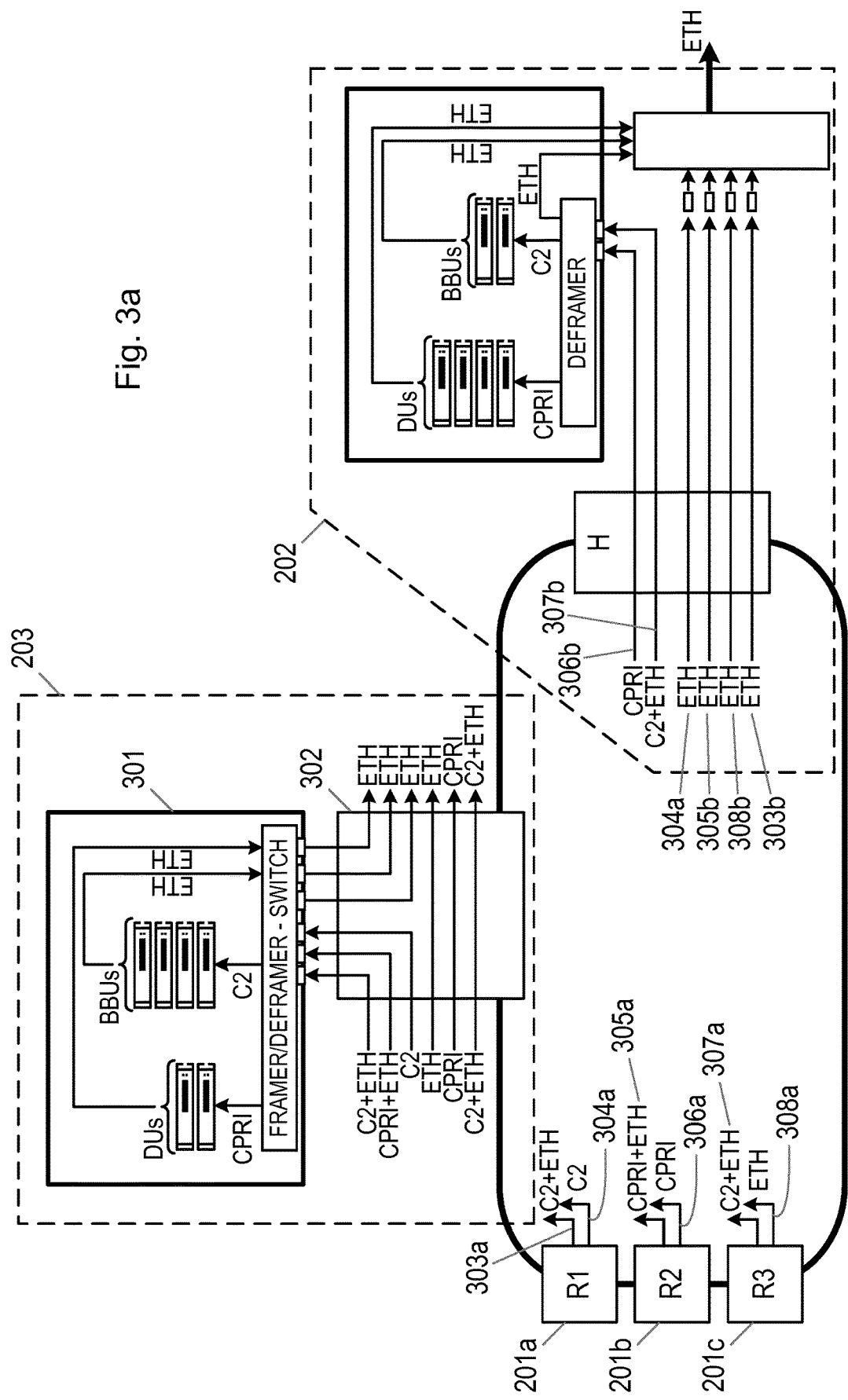
FIG. 3a illustrates a transport network according to an embodiment.

FIG. 3a illustrates a network according to another embodiment. This figure illustrates the effect of the disclosure for a particular selection of types of traffic input at the remote access nodes 201. The particular mix of traffic types chosen in this example highlights use cases of the disclosure, but the proposed structure provides for support different types of traffic or different client combinations.

In this embodiment the access nodes 201 and the central hub node 202 are spaced apart geographically, for example approximately 10 km away from one another.

In this example the remote access node 201a is an access node for the traffic flows 303a and 304a on separate channels, for example separate optical channels. Any access node described may refer to a node comprising, or connected to, a radio unit or radio equipment. The radio unit may be in the form of a Remote Radio Head or Remote Radio Unit, RRU. The RRU may comprise RF circuitry and analog-to-digital/digital-to-analog converters and up/down converters. Alternatively or in addition, the access node may comprise, or be connected to, a Radio Base Station (e.g. NodeB/eNodeB) comprising baseband processing functions. Such a Radio Base Station is configured to output and received to/from the central hub node data which The traffic flows may be from different user equipment, UEs. In this example, aggregated traffic flows 303a comprise radio data (e.g. transmitted in packets) labelled as C2 and Ethernet traffic. The aggregated traffic flow 304a comprises radio data traffic. The radio data traffic transmitted in these traffic flows may be used to transport 5G-Nx1 type traffic which has responsiveness requirements, e.g. latency constraints, which require a 2 km maximum distance between the radio unit and a baseband unit.

Figure 3B:
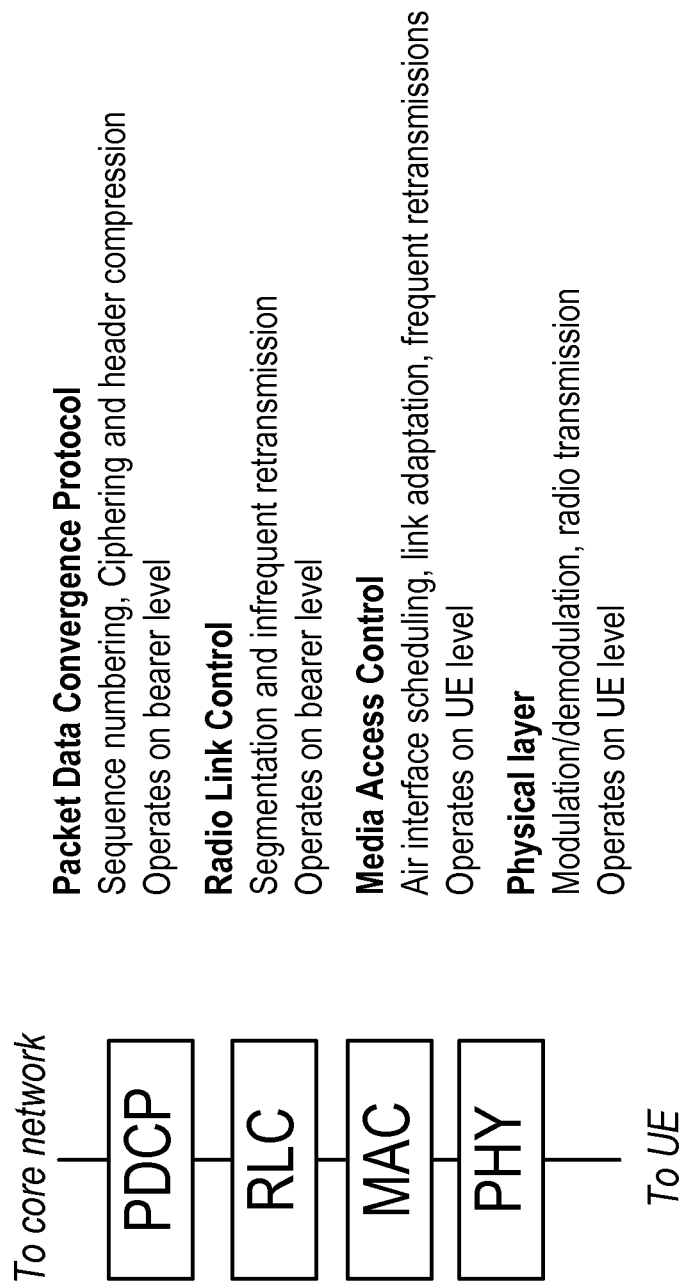
FIG. 3b shows a schematic of a protocol stack.

Given that in the example of FIG. 3a the hub node is approximately 10 km from the remote access nodes 201, the central hub node 202 would be too far away to comply with such a reach limit. Therefore, the two channels 303a and 304a are selected to be processed at the intermediate node 203, for example by terminating the traffic flows at the intermediate node 203. The processing at the intermediate node 203 may comprise baseband processing of at least some of the traffic flows 303a and 304a received at the intermediate node 203 into Ethernet traffic flows 303b and 304b towards the central hub node 202, as will be described in further detail with reference to any of FIGS. 4 to 8. In this example, and other embodiments described herein, the baseband processing may include Medium Access Control (MAC) level processing. In other words, the baseband processing involves processing at a MAC level of a protocol stack shown in FIG. 3b. As such, at least the MAC layer is placed on the intermediate node, thus giving good responsiveness in the scheduling (responsiveness to air interface fluctuations) and fast retransmissions. In some examples, the Radio Link Control, RLC, layer may also be placed in the intermediate node, such that the RLC layer is also terminated and processed in the intermediate node 203. The RLC processing may allow for re-segmentation of the data to adapt to any changes in link adaptation (e.g. number of bits to transmit/receive), or to maintain a reasonably sized local buffer for retransmissions. In some examples, the intermediate node 203 may be considered as carrying out Layer 2 processing of the traffic flows for selected UEs. In some examples, the intermediate node 203 may, or may not, carry out processing of other protocols within Layer 2 or processing of higher layers.

In some aspects, the intermediate node terminates both the transport network channel (to find the individual single user traffic flows) and the single user traffic flows that have responsiveness requirements. This may be achieved by using a special transport channel for the intermediate node, e.g. an access node 201 has different interfaces for the intermediate node 203 and central hub node 202, e.g. different optical wavelengths. Alternatively, the arrangement uses a common transport channel from access node 201, and the intermediate node 203 has to look at the transport network channel to find which packets relate to the one or more single user flows selected to be terminated there. An example scenario is that the common interface is an Ethernet link on a wavelength and the access node 201 addresses packets to either intermediate node 203 or central hub node 202.

In FIG. 3a, the remote access node 201b is an access node for the traffic flows 305a and 306a. In this example the traffic flow 305a comprises CPRI and Ethernet traffic, and the traffic flow 306a comprises CPRI traffic. The CPRI traffic transmitted in traffic flow 305a together with the Ethernet traffic may be used to transport traffic which has responsiveness requirements, e.g. latency constraints, for which the central hub node 202 would be too far away. Therefore, the traffic flow 305a is terminated for selective processing at the intermediate node, as will be described with reference to any of FIGS. 4 to 8. However, the CPRI traffic transmitted in traffic flow 306a does not have responsiveness requirements, i.e. is not latency critical, and therefore bypasses the intermediate node 203 as will be described with reference to any of FIGS. 4 to 8. Thus, the central hub node 202 receives traffic flow 305b which has been processed by the intermediate node 203, and traffic flow 306b which has not been processed by the intermediate node 203 (i.e. because traffic flow 306a has bypassed the intermediate node 203).

The remote access node 201c is an access node for the traffic flows 307a and 308a. In this example the traffic flow 307a comprises packetized radio data traffic (labelled C2) and Ethernet traffic, and the traffic flow 308a comprises Ethernet traffic. Unlike the traffic flow 303a, the radio data traffic transmitted in traffic flow 307a is used to transport radio data (e.g. LTE_ traffic with a responsiveness requirement, or a latency constraint, resulting in a 12 km maximum distance between the radio unit and a baseband unit, i.e. greater than the distance between the remote access unit 201c and the central hub node 202. Therefore this traffic flow 307a (comprising an aggregation of a plurality of traffic flows of individual UEs) is able to bypass the intermediate node 203, and is received as traffic flow 307b as will be described in any one of FIGS. 4 to 8 below. The traffic flow 308a has no responsiveness requirements, and therefore is able to bypass the intermediate node 203, and is received as traffic flow 308b at the central hub node 202, as will be described with reference to any one of FIGS. 4 to 8. In further examples, any traffic flow from a remote access node may be processed at the intermediate node 203, even if this is not required by a responsiveness requirement, or a latency constraint. For example, the network may determine that the intermediate node 203 is better suited to carry out the baseband processing, for example, due to a high load at the central hub node 202. In some examples, the network (e.g. a network controller) determines at which node the baseband processing is carried out, based on a responsiveness requirement, or a latency constraint and/or other factors, e.g. traffic load levels at a node or transport network limits. The network sets the destination of the flows, e.g. packet headers accordingly, and/or configures the central hub node 202 and/or intermediate node 203. In some examples, radio coordination requirements or load requirements may also or alternatively be used to select the intermediate node or central hub node for processing of a particular one or more traffic flow.

In some examples, the central node will terminate the UE processing, e.g. by default. When the UE sets up a latency critical service the responsibility of the UE will be handed over to the intermediate node. For example, both the central and the intermediate node may send transmission and reception requests to the radio in the access node 201, e.g. for packetized radio data. A switch in the intermediate node 203 will act on the Ethernet header of the radio data packets (e.g. C2). Thus, the intermediate node switch is configured to act on the received packet headers. An alternative is to set up the users (i.e. UEs) for processing in the intermediate node and give them away to the central hub node if the capacity of the intermediate node is insufficient and/or the UE is not using any latency critical service. The intermediate node is then used as long as it is enough, and the central node can be down-sized. This option provides for load share between the central hub node and intermediate node. For radio data (e.g. CPRI), the intermediate node may add IQ samples to the downlink CPRI stream, or have its own CPRI stream added by the radio access node in 201.

Thus, from above it can be seen that the traffic flows between the at least one remote access node 201 and the central hub node 202 pass via the intermediate node 203, wherein the intermediate node is configured to selectively process a traffic flow depending on a responsiveness requirement of the traffic flow. In the example of FIG. 3a the traffic flows 303a to 308a received at the intermediate node 203 are output as traffic flows 303b to 308b which are either processed or bypassed versions of the input traffic flows 303a to 308a. The selective processing by the intermediate node allows one or more traffic flows for a particular UE(s) to be a processed at the intermediate node with a lower latency/higher responsiveness when required or when this would be advantageous for the network, and allows one or more traffic flows for further one or more UE to be a processed at the central hub node.

Therefore traffic flows 303a, 304a and 305a can be considered to contain traffic which is latency critical, or having responsiveness requirements, in the example of FIG. 3a. For example, these traffic flows may have a latency dependent requirement that the distance between nodes is less than the distance between said at least one remote access node 201 and the central hub node 202.

FIG. 3a shows an example where the intermediate node 203 comprises a switching module 302 for controlling whether a traffic flow is to be selectively processed at the intermediate node, and a processing unit 301, for example a baseband processing unit. As will be explained below, the switching module 302 of the intermediate node 203 may be replaced in other embodiments by a splitter module, as will be explained further with reference to FIGS. 4 to 8.

Figure 4:
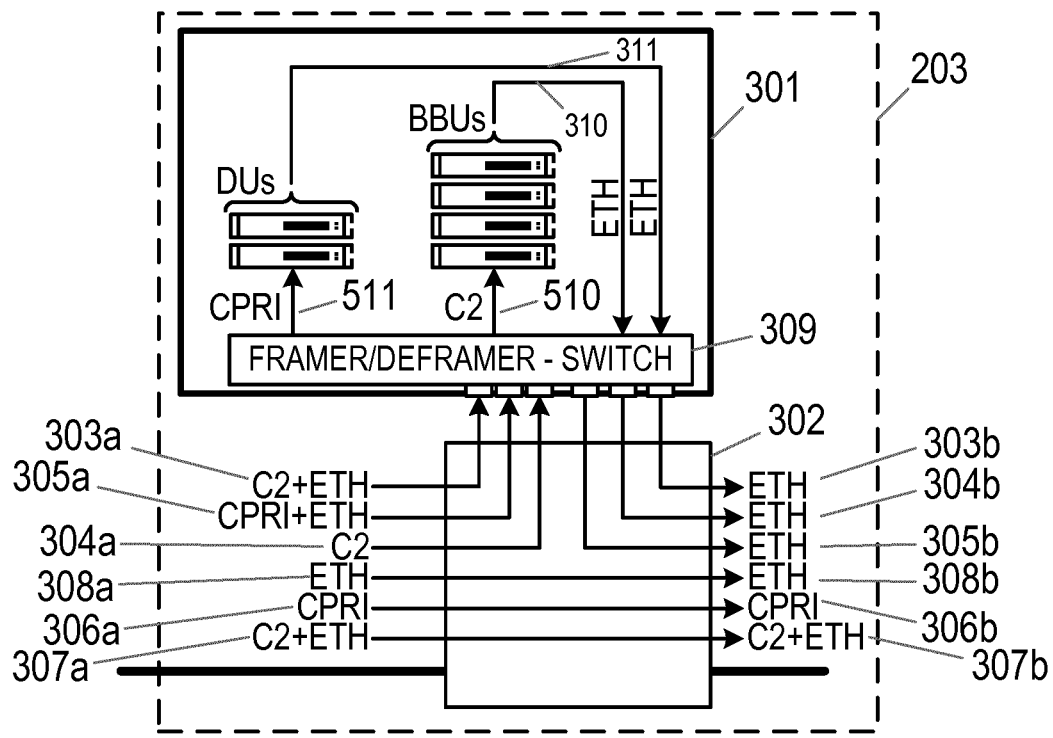
FIG. 4 illustrates an example of an intermediate node operating in an uplink direction according to an embodiment.

FIG. 4 illustrates an intermediate node according to an embodiment, with traffic flowing in an uplink direction (i.e. between a remote access node and a central hub node). The intermediate node 203 receives the traffic flows 303a to 308a.

As described with reference to FIG. 2, the intermediate node 203 is configured to selectively process a traffic flow depending on a responsiveness requirement of the traffic flow. In particular, the intermediate node 203 may be configured to selectively process a traffic flow, e.g. depending on whether the responsiveness requirement of the traffic flow requires that the distance between nodes is less than the distance between said at least one remote access node 201 and the central hub node 202.

In this embodiment the intermediate node 203 comprises a processing unit 301 for processing traffic flows, and a switching module 302.

The switching module 302 is selectively configured to input a traffic flow into the processing unit 301 to process at least part of the traffic flow, if said at least part of the traffic flow associated with the at least one remote access node 201 has a responsiveness requirement.

The switching module is also selectively configured to bypass the processing unit 301, e.g. if the traffic flow associated with the at least one remote access node 201 does not have a responsiveness requirement, or a responsiveness requirement in which the distance between nodes can be greater than or equal to the distance between said one of the at least one remote access node (201) and the central hub node (202).

As described in FIG. 3a, in this embodiment at least part of the traffic flows 303a, 304a and 305a contain traffic with a latency dependent requirement, these are the traffic flows which are input into the processing unit 301 by the switching module 302.

The parts of the traffic flows 303a, 304a and 305a which contain traffic to be processed at the intermediate node, e.g. with a responsiveness requirement, are then extracted by a framer/deframer switch 309 and processed by the processing unit resulting, for example, in Ethernet traffic which may be recombined with any other traffic of the original traffic flow.

For the aggregated traffic flows 303a and 304a the framer/deframer switch 309 extracts the radio data parts of the traffic flows 303a and 304a and the processing unit baseband processes the radio data part resulting in Ethernet traffic 310. This Ethernet traffic 310 can be split back into the parts which originated from the traffic flows 303a and 304a in the framer/deframer switch 309, so that the Ethernet traffic which had formed the radio data part of the traffic flow 303a can be recombined with the Ethernet part of the traffic flow 303a that bypassed the framer/deframer switch 309, resulting in a final Ethernet traffic flow 303b. The rest of the Ethernet traffic is the traffic which had formed the radio data traffic flow 304a, which is output from the framer/deframer switch 309 as a processed (e.g. an Ethernet) traffic flow 304b.

For the traffic flow 305a, which again has latency dependent traffic according to this example, the framer/deframer switch 309 extracts the radio data (e.g CPRI) part of the traffic flow 305a and the processing unit, in this example using digital units (DUs), processes the radio data resulting in Ethernet traffic 311. The Ethernet traffic 311 is then recombined with the Ethernet part of the traffic flow 305a which bypassed the framer/deframer switch 309, resulting in an Ethernet traffic flow 305b.

In some embodiments therefore, for the traffic flows for each UE (which may be considered as an aggregated traffic flow) that occupies a single optical channel, if a first part of the traffic flow associated with the at least one remote access node 201 or UE has a responsiveness requirement, and a second part of the traffic flow does not have a responsiveness requirement, the first and second parts of the traffic flow are output from the intermediate node 203 on a single optical channel.

Using a switching module 302 therefore has the advantage that optical channels can be re-used, without necessarily requiring the use of one or more additional optical channels (e.g. wavelengths) to carry traffic flows which have been processed at the intermediate node 203.

For traffic flows 306a, 307a and 308a, which in this example are traffic flows that do not have a responsiveness requirement, the switching module 302 is configured to cause the traffic flows 306a, 307a and 308a to bypass the intermediate node 203 without being baseband processed at the intermediate node 203.

Returning to FIG. 3a, the output traffic flows 303b to 308b from the intermediate node 203 are input into the central hub node 202. The central hub node 202 is then configured to process the traffic flows 306b, 307b and 308b, for example baseband processing, as these are the traffic flows which have not yet been processed in the intermediate node 203, i.e. the traffic flows without a responsiveness requirement.

Figure 5:
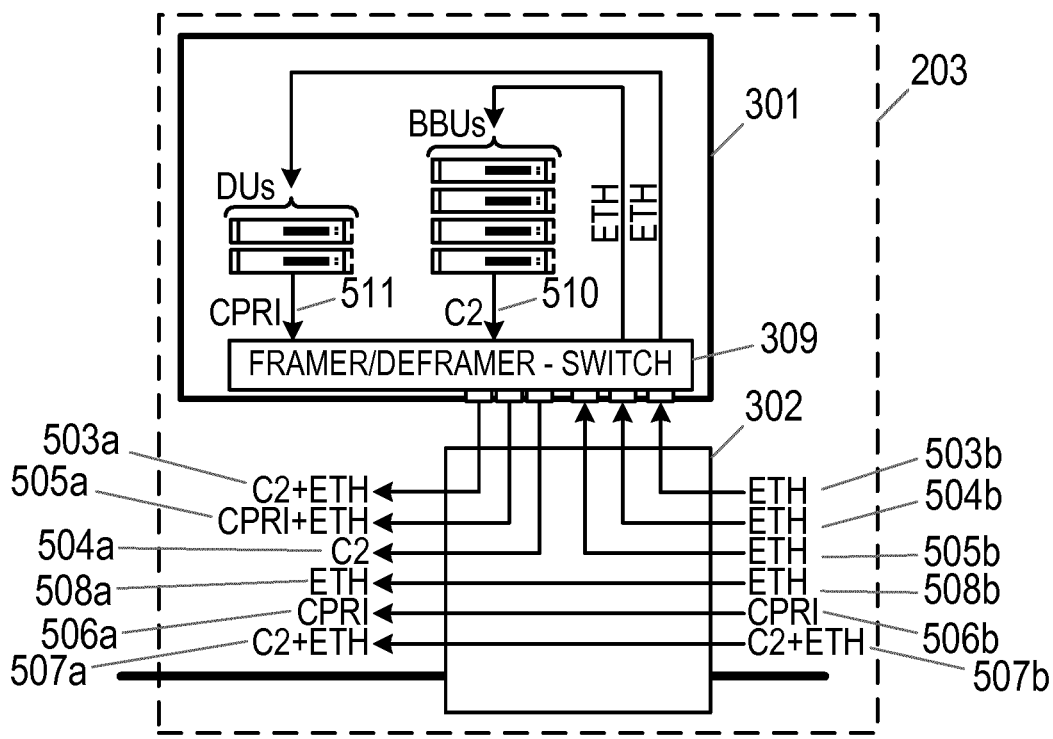
FIG. 5 illustrates the intermediate node of FIG. 4, with the traffic flowing in a downlink direction according to an embodiment.
Figure 6:
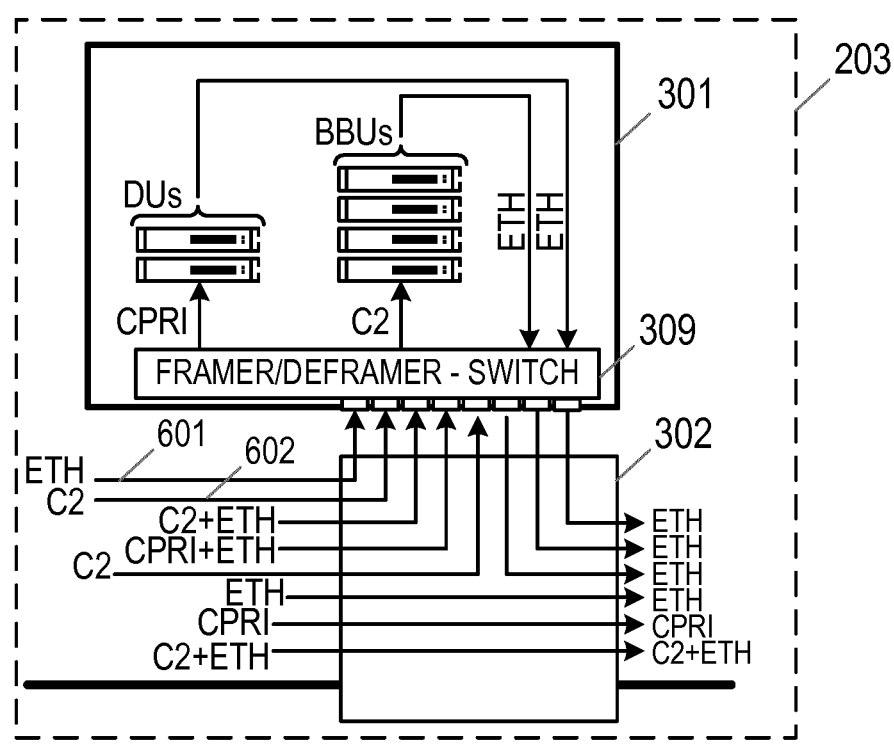
FIG. 6 illustrates an example of an intermediate node according to an embodiment.

FIG. 5 illustrates the intermediate node of FIG. 4, but with the traffic flowing in a downlink direction. Similar features to those of FIG. 4 have been given the same reference numerals.

In the downlink direction, the central hub 202 processes any traffic flows, or parts of traffic flows, which do not have a responsiveness requirement, and does not process the traffic flows which have a responsiveness requirement.

The central hub outputs the traffic flows 503b to 508b to the intermediate node 203 in the downlink direction. For the sake of simplicity, the constitution of these traffic flows in terms of the type of traffic they carry is equivalent to the traffic flows 303b to 308b. Furthermore, they are intended to reach the access nodes, at which point they will be denoted 503a to 508a respectively, with the same traffic constitution as the traffic flows 303a to 308a.

It will be appreciated that different constitutions of traffic flows may be output by the central hub, and they will be dealt with according to the disclosure as described.

As in FIG. 4, the switching module 302 is selectively configured to input a traffic flow into the processing unit 301 to process at least part of the traffic flow, if said at least part of the traffic flow associated with the at least one remote access node 201 has a responsiveness requirement.

The switching module is also selectively configured to bypass the processing unit 301, e.g. if the traffic flow for a UE associated with the at least one remote access node 201 does not have a responsiveness requirement, or a responsiveness requirement in which the distance between nodes can be greater than or equal to the distance between said one of the at least one remote access node 201 and the central hub node 202.

As in this embodiment, at least part of the aggregated traffic flows 503b, 504b and 505b contain traffic with a responsiveness requirement, therefore these are the traffic flows which are input into the processing unit 301 by the switching module 302.

In some examples the intermediate node 203 is configured to have predetermined which traffic flow or traffic type has a responsiveness requirement, and which do not have a responsiveness requirement.

The parts of the traffic flows 503b, 504b and 505b which contain traffic with a responsiveness requirement are then extracted by a framer/deframer switch 309 and processed by the processing unit resulting in radio traffic which may be recombined with any other traffic of the original traffic flow to produce final traffic flows 503a to 505a. In some examples the switching module 302 detects a particular type of traffic flow using header information with the traffic flows, or some other form of tagging mechanism.

For the traffic flows 503b and 504b the framer/deframer switch 309 extracts the Ethernet parts of the traffic flows 503b and 504b which are expected to be received at the remote access nodes as radio data traffic, and the processing unit 301 processes them, for example using BBUs, resulting in radio data traffic 510. This radio data traffic 510 can be split back into the parts which originated from the traffic flows 503b and 504b in the framer/deframer switch 309 so that the radio data traffic can be recombined with the remaining Ethernet part of the traffic flow 503b that bypassed the framer/deframer switch 309, resulting in a final aggregated traffic flow 503a of combined radio data and Ethernet traffic. The remainder of the radio data traffic is the traffic which had formed the Ethernet traffic flow 504b and it is output from the framer/deframer switch as a final radio data traffic flow 504a.

For the traffic flow 505b the framer/deframer switch 309 extracts the part of the traffic flow 505b which is expected to be received at the remote access nodes as CPRI traffic, and the processing unit 301 processes this traffic flow, for example using DUs, resulting in CPRI traffic 511. The CPRI traffic 511 is then recombined with the Ethernet part of the traffic flow 505b which bypassed the framer/deframer switch 309, resulting in a final traffic flow 505a of combined CPRI and Ethernet traffic.

In some embodiments therefore, for each traffic flow that occupies a single optical channel, if a first part of the traffic flow associated with the at least one remote access node 201 has a responsiveness requirement, and a second part of the traffic flow does not have a responsiveness requirement, the first and second parts of the traffic flow are output from the intermediate node 203 on a single optical channel.

FIG. 6a illustrates an intermediate node 203 according to another embodiment, operating in an uplink direction. The intermediate node 203 is similar to that of FIG. 4.

In this embodiment, radio or wireline clients located in a vicinity of the intermediate node 203 can use the intermediate node as a remote access node or access point. For example, an Ethernet traffic flow 601 and a radio data traffic flow 602 are injected into the intermediate node 203, treating it as a first instance access node. In some embodiments the intermediate node 203 consolidates the Ethernet traffic flow 601 with other Ethernet traffic received from at least one access node 201, and forwards the Ethernet traffic to the central hub node. The radio data traffic may either be baseband processed at the intermediate node and combined with other traffic flows, or forwarded directly to the central hub node for processing, depending on the responsiveness requirements of the radio data traffic.

Such an embodiment allows optical channels to be added/dropped in the vicinity of the intermediate node.

It is noted that an intermediate node of this type effectively combines an intermediate node and a remote access node 201 into one module. In such an embodiment the intermediate node 203 forms part of the at least one remote access node 201.

It is noted that, in some embodiments, a combined intermediate node and remote access node 203/201 of this type may exist alone with a central hub node 202, without necessarily having a further, or separate, remote access node 201 coupled thereto in the transport chain.

Figure 7:
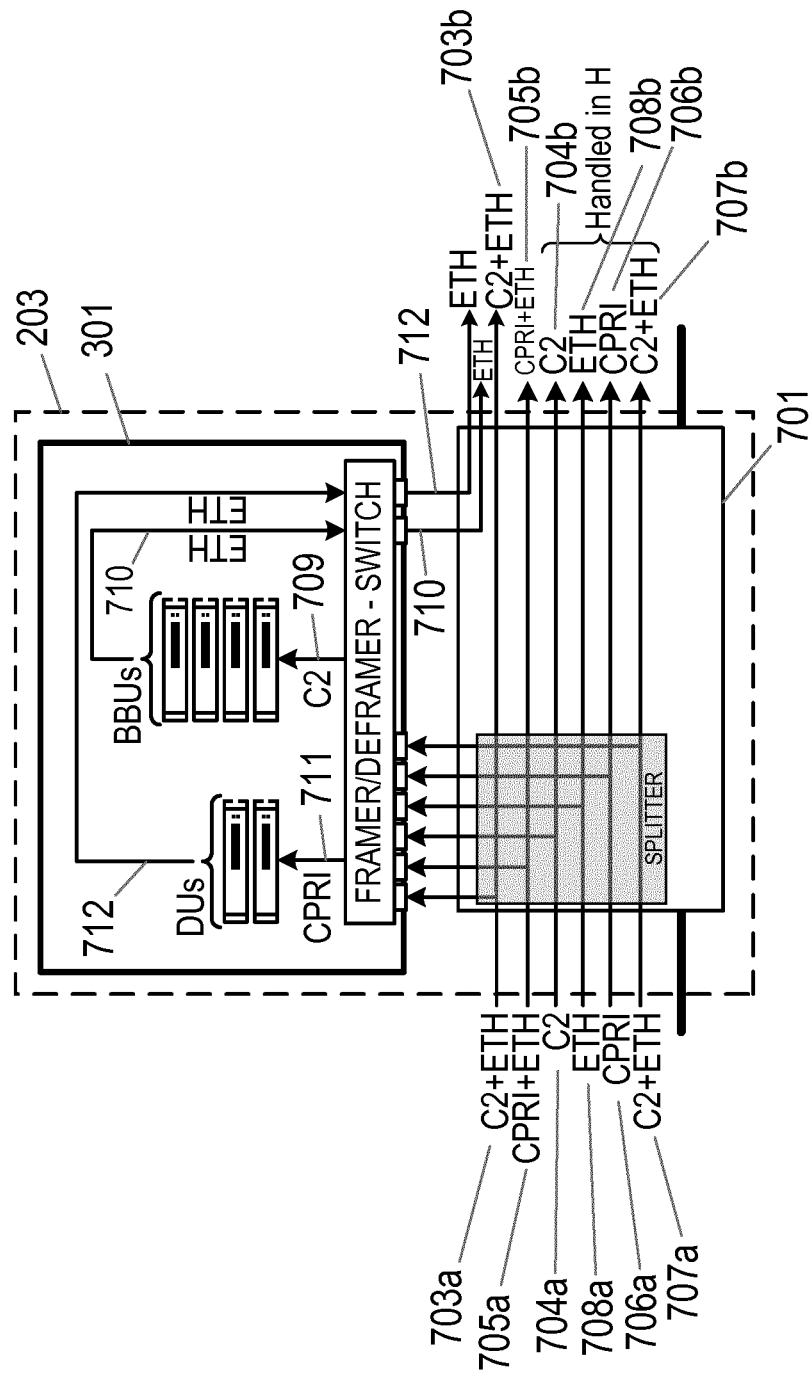
FIG. 7 illustrates an intermediate node operating in an uplink direction according to an embodiment.

FIG. 7 illustrates an intermediate node according to another embodiment, operating in an uplink direction. The embodiment of FIG. 7 is similar to that of FIGS. 4 to 6, but whereby the intermediate node 203 comprises a splitter module 701 instead of the switching module 302 of FIGS. 4 to 6.

Similarly to FIG. 4, the intermediate node 203 is configured to selectively process a traffic flow depending on a responsiveness requirement of the traffic flow. In particular, the intermediate node 203 may be configured to selectively process a traffic flow depending on whether the responsiveness requirement of the traffic flow requires that the distance between nodes is less than the distance between said at least one remote access node 201 and the central hub node 202. In this example the traffic flows 703a to 708a are equivalent to traffic flows 303a to 308a described previously with the same latency requirements.

In this embodiment, the splitter module 701 is configured to duplicate all traffic flows received from the at least one remote access node 201 and send one copy of said traffic flows to the central hub node 202, and input one copy of said traffic flows to the processing unit 301 for processing. As mentioned in other embodiment, the processing may comprise baseband processing, and in some examples the baseband processing involves MAC level processing.

The splitter module 701 may comprise, for example, an optical splitter, such as a passive optical splitter, such that the traffic flows received from the remote access nodes 201 are duplicated with the optical splitter. It is noted that the splitting process loss does not impact the power budget significantly, due to the short distances.

In particular, a first copy of the traffic flows, 703a to 708a are input into the processing unit 301 for processing by the splitter module 701. A second copy of the traffic flows, 703b to 708b are output from the splitter module 701 towards the central hub node 202.

The framer/deframer switch 309 in the processing unit 301 extracts the parts of the traffic flows which have a responsiveness requirement and processes this traffic. In this example, the radio data parts of traffic flows 703a and 704a are extracted as radio data traffic 709. This is then processed, for example using BBUs, into Ethernet traffic 710. The framer/deframer switch 309 then outputs the Ethernet traffic 710 to the central hub node 202 on a separate optical channel.

In this example, the radio data (e.g. CPRI) part of traffic flow 705a is extracted by the framer/deframer switch 309 as radio data (e.g. CPRI) traffic 711. This is then processed, for example using DUs, into Ethernet traffic 712 and output to the central hub node 202 on a separate optical channel.

The Ethernet traffic flows 710 and 712 are output on separate optical channels in order to avoid conflict with any of the replica channels 703b to 708b.

Any other traffic received at the framer/deframer switch 309, i.e. traffic not having a responsiveness requirement, is discarded by the intermediate node 203 and not processed.

The central hub node will therefore receive the traffic flows 703b to 708b along with the Ethernet traffic flows 710 and 712. As the traffic flows 710 and 712 represent processed versions of the radio data (e.g. using different protocols) parts of traffic flows 703b and 704b, and 705b, respectively, the radio data parts of traffic flows 703b, 704b and 705b are discarded at the central hub node 202 and replaced with the processed traffic versions received from traffic flows 710 and 712.

The other traffic flows 706b, 707b and 708b, i.e. the traffic flows not having a responsiveness requirement (and which have not been processed by the intermediate node), may be processed as necessary in the central hub node.

The central hub node is therefore configured to discard an unprocessed traffic flow for an unprocessed traffic flow associated with one of the at least one remote access node having a responsiveness requirement, and the central hub node 202 is configured to process the traffic flow for a traffic flow associated with one of the at least one remote access node not having a responsiveness requirement.

Figure 8:
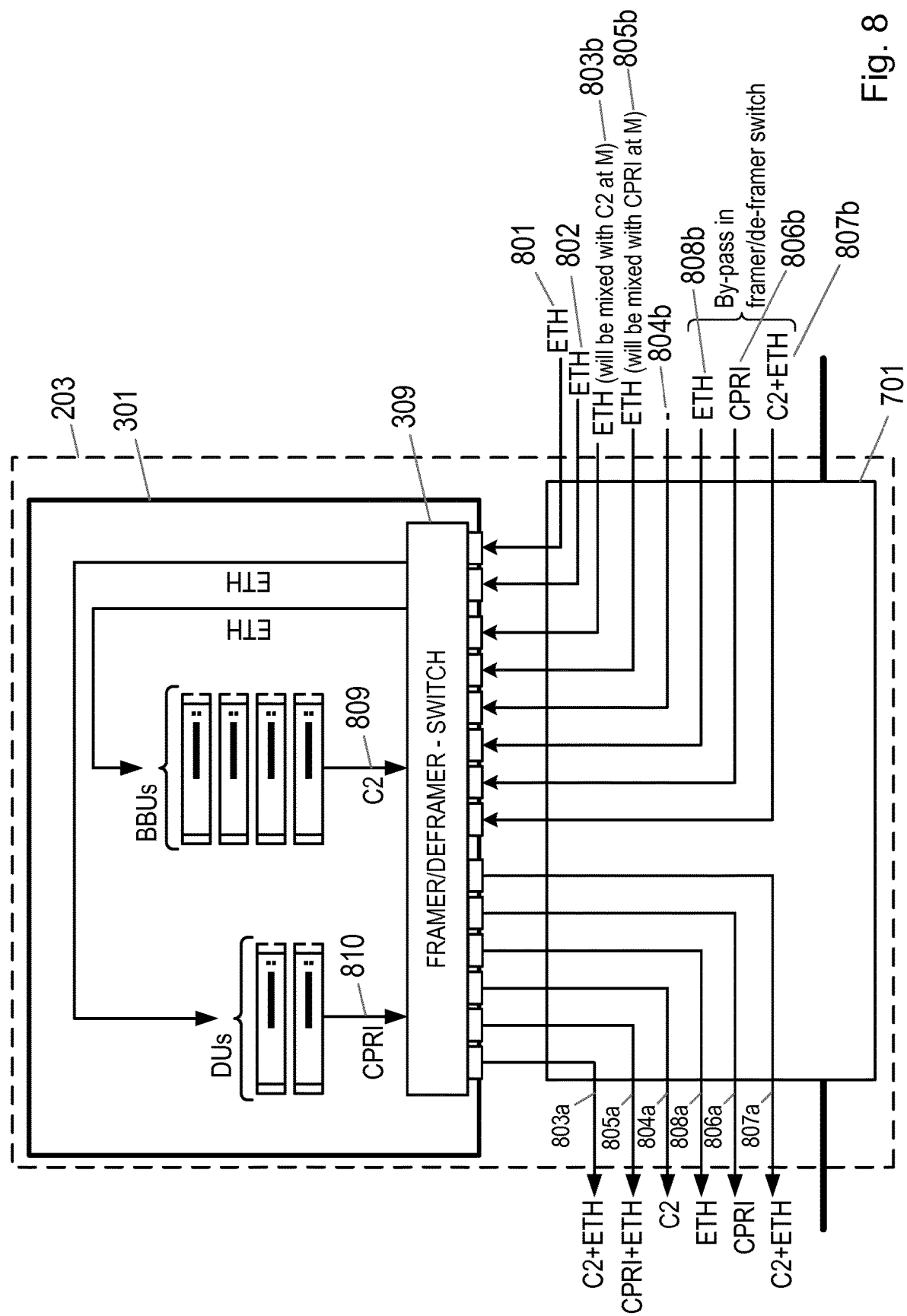
FIG. 8 illustrates the intermediate node of FIG. 7 operating in a downlink direction, according to an embodiment.

FIG. 8 illustrates the intermediate node of FIG. 7, i.e. comprising a splitter module 701, operating in a downlink direction, according to another embodiment.

In the downlink direction, the central hub node extracts any parts of traffic flows comprising traffic with a responsiveness requirement and sends them to the intermediate node as Ethernet traffic on separate optical channels. In this example the Ethernet traffic with a responsiveness requirement is output from the central hub on first and second channels 801 and 802. The remaining traffic, i.e. traffic not having a responsiveness requirement, is processed as necessary in the central hub and sent to the intermediate node.

The intermediate node in this embodiment receives the traffic flows 801, 802 and 803b to 808b from the central hub node 202 (not shown).

For simplicity, the traffic on channel 801 contains traffic with a responsiveness requirement equivalent to the Ethernet traffic with a responsiveness requirement of 503b and 504b. The traffic on channel 802 contains traffic with a responsiveness requirement equivalent to that of traffic flow 505b.

The traffic flows 803b to 805b contain traffic equivalent to the traffic not having a responsiveness requirement of traffic flows 503b to 505b respectively.

The traffic flows 806b to 808b contain traffic equivalent to that of 506b to 508b.

Again, in this embodiment, the central hub node 202 outputs the traffic 801 and 802 having a responsiveness requirement on separate optical channels in order to avoid conflict with the traffic flows 803b to 808b.

In the downlink direction the intermediate node 203 receives traffic with a responsiveness requirement on separate optical channels 801 and 802. The remaining optical channels 803b to 808b comprise traffic flows not having a responsiveness requirement.

The intermediate node 203 is configured to input all traffic flows, i.e. traffic flows 801, 802 and 803b to 808b, received from the central hub into the processing unit 301. This is done using the splitter module 701.

The processing unit 301 is configured to process the traffic flow for a traffic flow associated with a UE served by one of the at least one remote access node 201 having a responsiveness requirement. Therefore in this embodiment, the intermediate node 203 is configured to processes the traffic flows 801 and 802.

The processing of the traffic flow 801, for example using BBUs, results in the radio data (e.g. packet digital radio data) traffic 809, and the processing of the traffic flow 802, for example using DUs, results in the radio data (e.g. CPRI) traffic 810. The processing unit 301 is configured not to process the traffic flow for a traffic flow associated with one of the at least one remote access node 201 not having a responsiveness requirement. Therefore the traffic flows 803b to 808b selectively bypass the BBUs/DUs using the framer/deframer switch 309.

This radio data traffic 809 can be split back into the parts which are intended for the final traffic flows 803a and 804a respectively, in the framer/deframer switch 309, so that the radio data traffic can be recombined with the remaining Ethernet part of the traffic flow 803b that bypassed the framer/deframer switch 309, resulting in a final traffic flow 803a of combined radio data and Ethernet traffic. The remainder of the radio data traffic 809 is the traffic which is output from the framer/deframer switch as radio data traffic flow 804a.

To form the traffic flow 805a the radio data (e.g. CPRI) traffic 810 is then recombined with the Ethernet traffic flow 805b which bypassed the framer/deframer switch 309, resulting in a traffic flow 805a of combined radio data and Ethernet traffic.

The remaining traffic flows 806b to 808b all bypass the framer/deframer switch, as they comprise traffic which does not have a responsiveness requirement, and are output as traffic flows 806a to 808a.

Figure 9A:
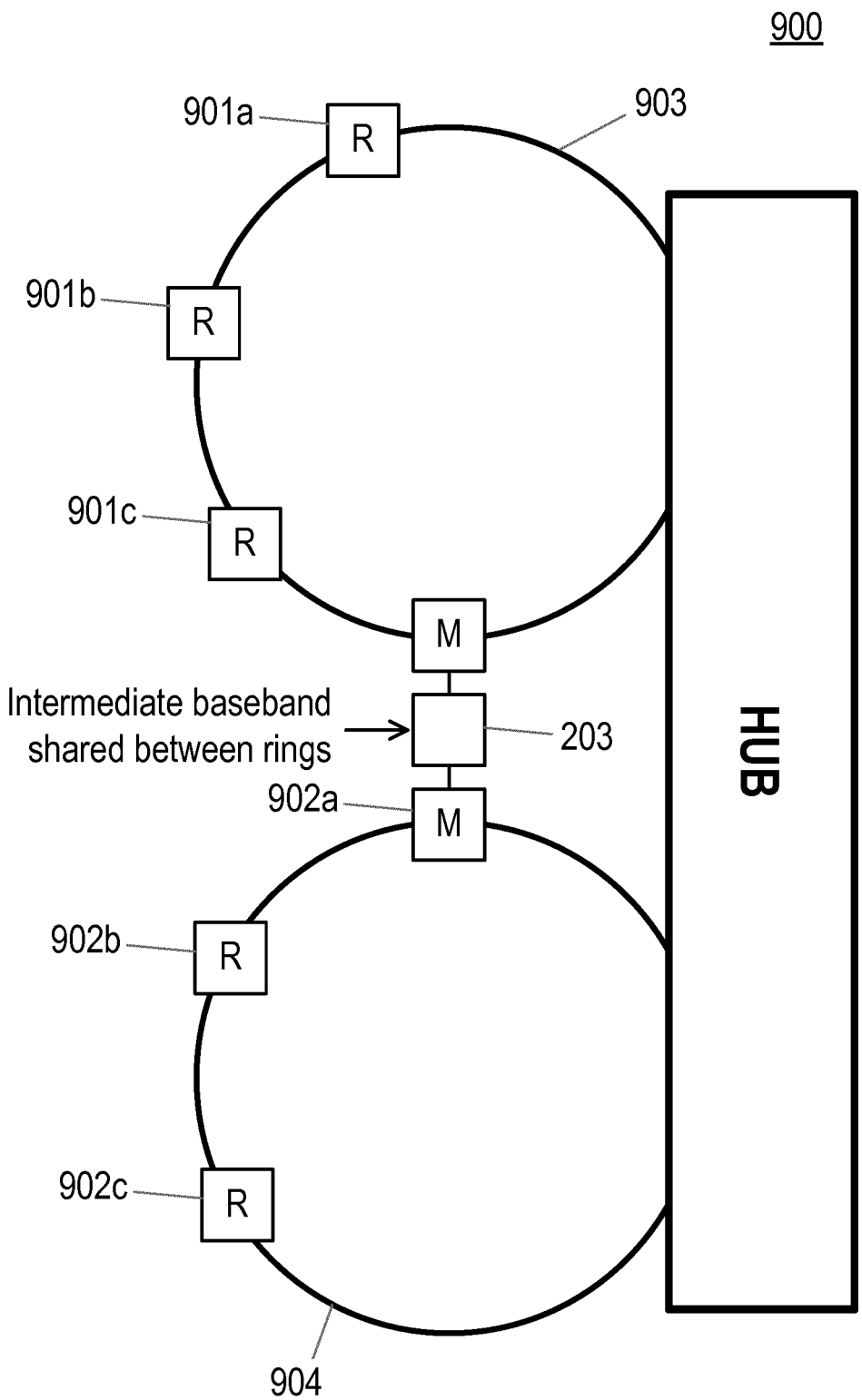
FIG. 9a illustrates a transport network according to an embodiment.

FIG. 9a illustrates a transport network according to another embodiment.

In this embodiment, the transport network 900 comprises one or more remote access nodes 901 which form part of a first ring 903.

The transport network 900 also comprises one or more remote access nodes 902 which form part of a second ring 904.

The first ring 903 and second ring 904 may share a first intermediate node 203. The first intermediate node may function as described with reference to any of FIGS. 4 to 8. This can reduce the baseband processing nodes in the network and permit the sharing of baseband processing resources between the intermediate nodes. For example, if latency critical traffic (i.e. having a responsiveness requirement) generated by a ring is reduced in a specific time interval, the processing resources of the intermediate node can be used for latency critical traffic generated by the other ring.

Figure 9B:
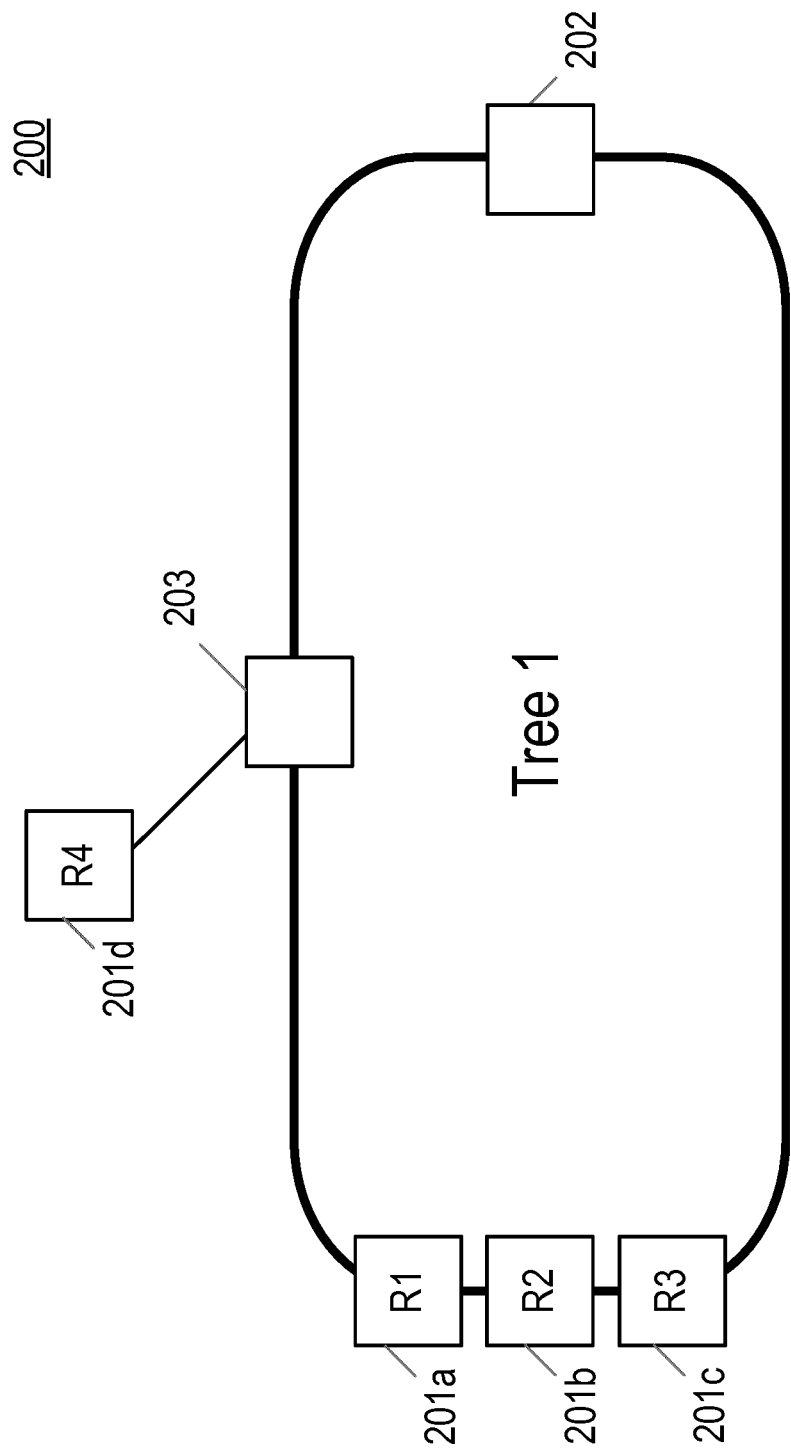
FIG. 9b illustrates a transport network according to an embodiment.

FIG. 9b shows an example of a first tree structure depicting how an intermediate node may be coupled according to a transport network according to an embodiment. In the tree of FIG. 9b the intermediate node 203 is connected to both a ring that comprises one or more remote access nodes, e.g. remote access nodes 201a, 201b, 201c, and to one or more separate remote access nodes, e.g. a separate remote access node 201d. The intermediate node 203 may be located, for example, in a wire-hub where multiple xHauls are aggregated. This is similar to FIG. 9a, in that the intermediate node 203 is in the aggregation.

Figure 9C:
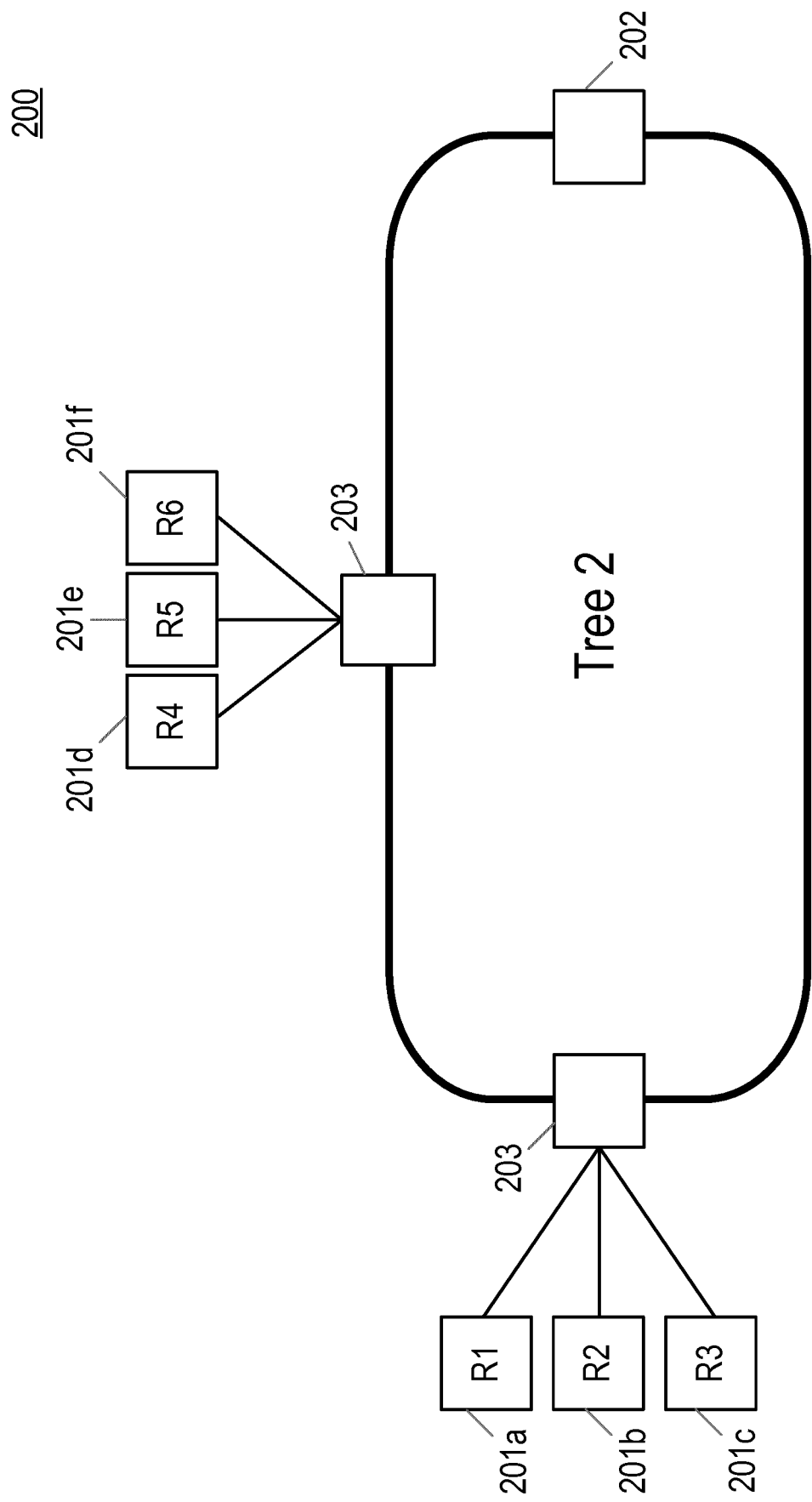
FIG. 9c illustrates a transport network according to an embodiment.

FIG. 9c shows an example of a second tree structure depicting how intermediate nodes 203 may be coupled. The tree structure of FIG. 9c comprises a first intermediate node having remote access nodes 201a, 201b and 201c connected thereto, and a second intermediate node 203 having remote access nodes 201d, 201e and 201f connected thereto. The tree structure of FIG. 9c may correspond, for example, to a set of sites with limited local processing close by, whereby the sites are connected in a ring. This may comprise, for example, of a house where a remote access node 201 is a small cell on a floor, and where an intermediate node 203 is in a basement of a house. As above, an intermediate node 203 is placed at the aggregation.

FIGS. 9b and 9c illustrate that an intermediate node as described in the embodiments herein may also be connected in a tree like structure and/or a ring like structure.

In further embodiments, a transport network may comprise a second intermediate node connected between the at least one remote access node and the central hub node in parallel with the first intermediate node. This can provide a backup for baseband processing in the intermediate node if there is a failure in the links to the first intermediate node. In addition, such an arrangement can be used to service one of the intermediate nodes.

In any of the above described embodiments, the responsiveness requirement or latency requirement of each traffic flow may depend on the type of traffic flow. For example, such traffic flows include radio data traffic types that may have a responsiveness requirement.

The transport network and intermediate nodes described herein may be used in various applications.

Elastic RAN is an emerging concept to enable optimal coordination across the entire network, either centralized, distributed or a mix of both. Elastic RAN will cover coordination functionalities, for example cooperative multi-point (CoMP) and Carrier Aggregation with full performance. There are no limits to the coordination area, and it is fully dynamic (elastic) throughout the network. The network may determine the processing node to be the intermediate node or the central hub node based on a determination of the RAN requirements, for example, Elastic RAN, e.g. to provide for CoMP or carrier aggregation, and/or based on processing load.

In Elastic RAN, the baseband units are interconnected through Ethernet switching. With Elastic RAN, the end-user can benefit from Carrier Aggregation and CoMP, even when covered by different cell sites (different baseband units) throughout the network.

The proposed network architecture, including transport networks and nodes as described herein, enables the sending of enhanced coordination data between the intermediate nodes and the central hub nodes, or between the intermediate nodes themselves.

Figure 10:
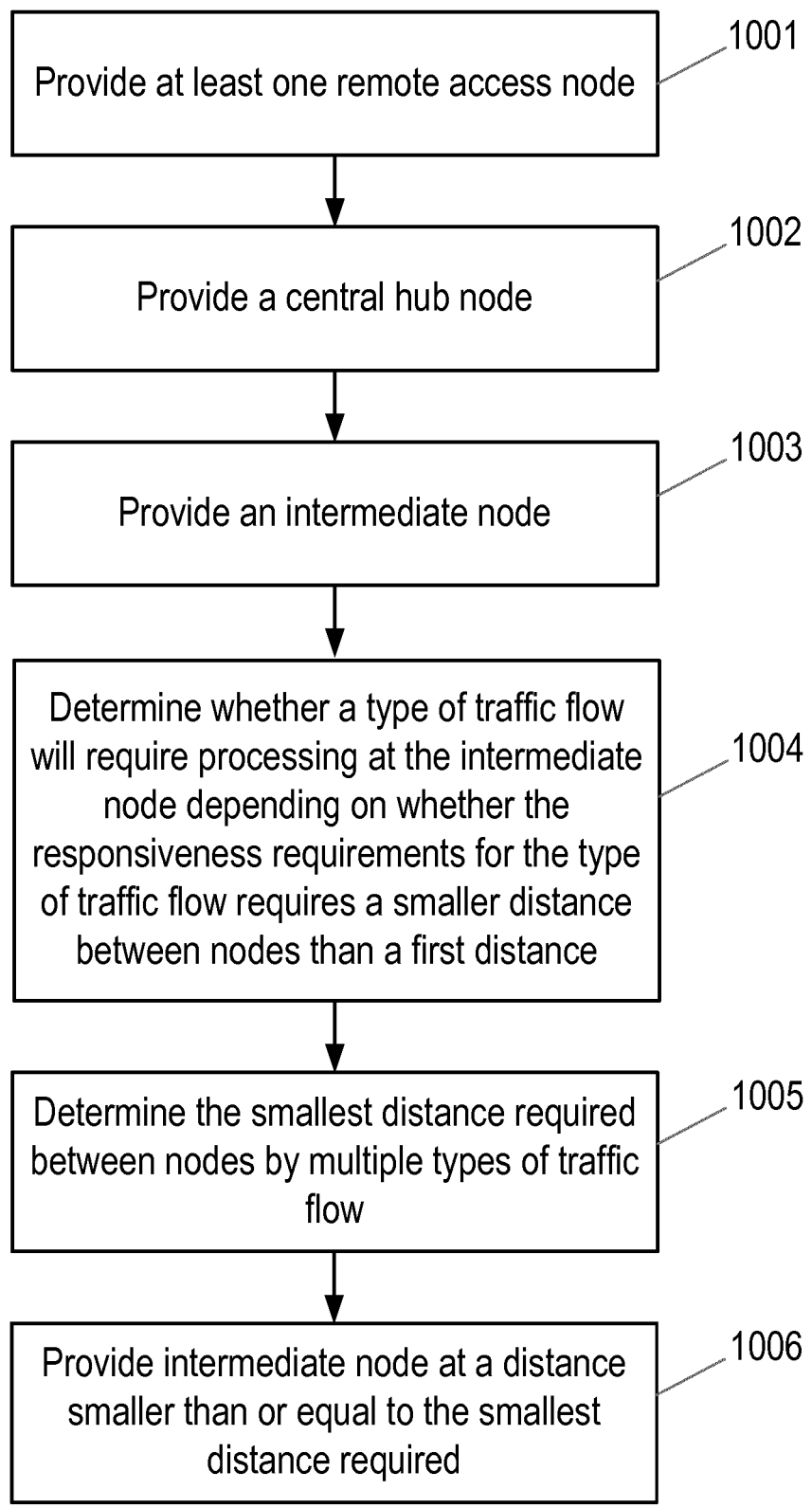
FIG. 10 is a flow chart of a method of providing a transport network according to an embodiment.

FIG. 10 is a flow chart of a method of providing a transport network according to an embodiment.

In step 1001 at least one remote access node is provided for receiving xHaul traffic.

In step 1002 a central hub is provided for transmitting and receiving xHaul traffic at a first distance from the at least one remote access node.

In step 1003 an intermediate node is provided for transmitting traffic flows between the at least one access node and the central hub node via the intermediate node.

In step 1004 it is determined whether a type of traffic flow will require processing at the intermediate node depending on whether the responsiveness requirements for the type of traffic flow requires a smaller distance between nodes than the first distance.

In step 1005 the smallest distance required between nodes by multiple types of traffic flow is determined; and In step 1006 the intermediate node is provided at a distance smaller than or equal to the smallest distance required.

As the intermediate node may be provided between the remote access nodes and the central hub node, the embodiments can be implemented retrospectively between hub nodes and access nodes which have a large enough distance between them to cause concerns regarding latency for xHaul traffic.

Figure 11:
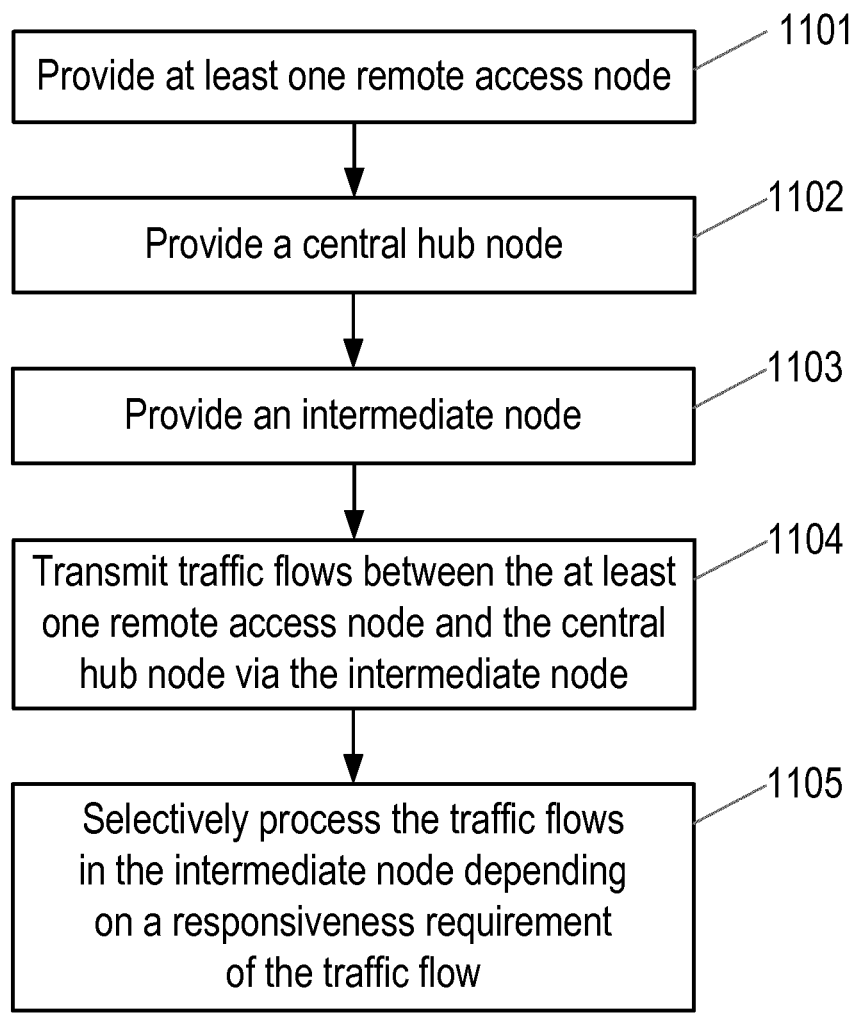
FIG. 11 illustrates a method of communicating traffic flows in a transport network according to an embodiment.

FIG. 11 illustrates a method of communicating traffic flows in a transport network according to embodiments of the disclosure.

In step 1101 at least one remote access node is provided.

In step 1102 a central hub node is provided.

In step 1103 an intermediate node is provided.

In step 1104 traffic flows are transmitted between the at least one remote access node and the central hub node via the intermediate node.

In step 1105 the traffic flows are selectively processed at the intermediate node depending on a responsiveness requirement of the traffic flow.

Figure 12:
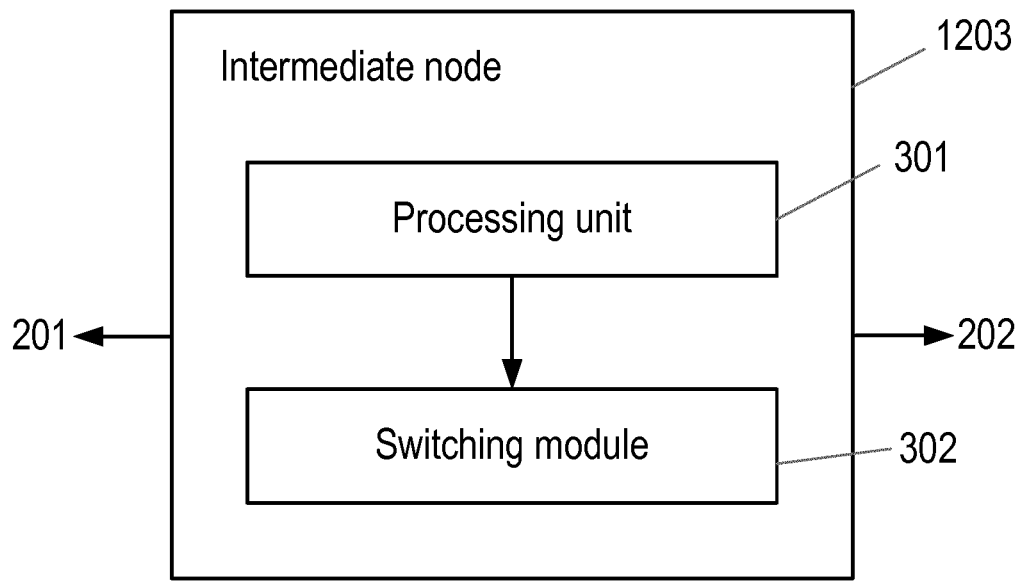
FIG. 12 illustrates an example of an intermediate node according to an embodiment.

FIG. 12 shows an example of an intermediate node 1203 according to an embodiment. As mentioned earlier, the intermediate node is configured such that traffic flows between at least one remote access node 201 (not shown) and a central hub node 202 (not shown) via the intermediate node 1203. The intermediate node 1203 is configured to selectively process a traffic flow depending on a responsiveness requirement of the traffic flow.

For example, the intermediate node is configured to selectively process a traffic flow depending on whether the responsiveness requirement of the traffic flow requires that the distance between nodes is less than the distance between said at least one remote access node 201 and the central hub node 202.

In the embodiment of FIG. 12, the intermediate node 1203 comprises a processing unit 301 for processing the traffic flow. The processing unit 301 may comprise, for example, one or more baseband processing units (BBUs) that perform MAC level processing, and one or more digital units (DUs).

In the embodiment of FIG. 12, the intermediate node 1203 comprises a switching module 302. The switching module may be selectively configured to input a traffic flow into the processing unit 301 to process at least part of the traffic flow, if said at least part of the traffic flow associated with the at least one remote access node 201 has a responsiveness requirement.

In some examples, for example relating to an optical transport network, each aggregated traffic flow (comprising a plurality of traffic flows for individual UEs) occupies a single optical channel and, if a first part of the traffic flow associated with the at least one remote access node 201 has a responsiveness requirement, and a second part of the traffic flow does not have a responsiveness requirement, the first and second parts of the traffic flow are output from the intermediate node 203 on a single optical channel.

The switching module 302 may be selectively configured to bypass the processing unit 301 if the traffic flow associated with the at least one remote access node 201 does not have a responsiveness requirement, or a responsiveness requirement where the distance between nodes is greater than or equal to the distance between said one of the at least one remote access node 201 and the central hub node 202.

Figure 13:
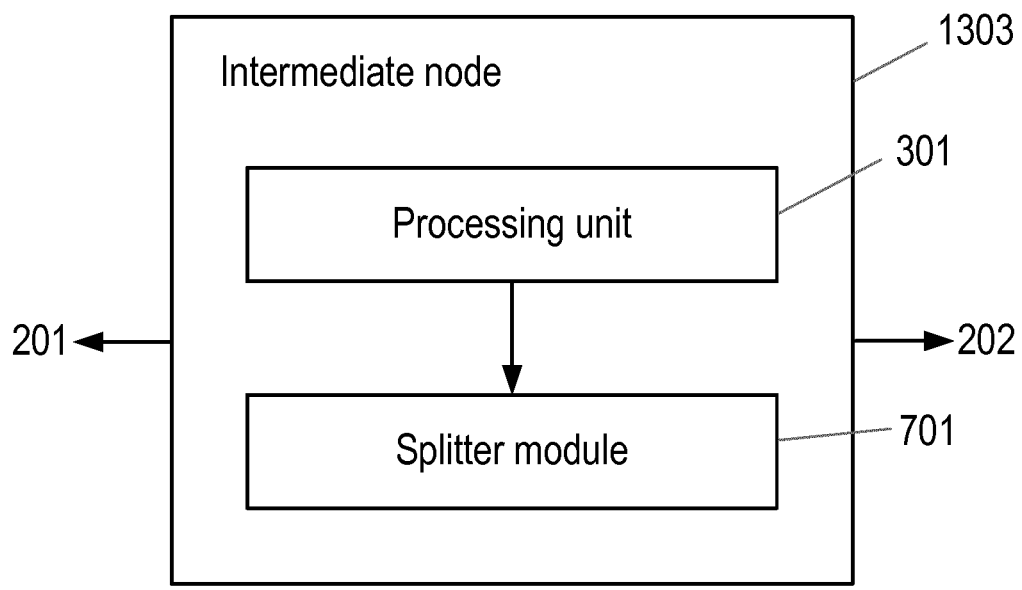
FIG. 13 illustrates an example of an intermediate node according to an embodiment.

FIG. 13 shows an example of an intermediate node 1303 according to another embodiment. As mentioned earlier, the intermediate node is configured such that traffic flows between at least one remote access node 201 (not shown) and a central hub node 202 (not shown) via the intermediate node 1303. The intermediate node 1303 is configured to selectively process a traffic flow depending on a responsiveness requirement of the traffic flow.

For example, the intermediate node is configured to selectively process a traffic flow depending on whether the responsiveness requirement of the traffic flow requires that the distance between nodes is less than the distance between said at least one remote access node 201 and the central hub node 202.

In the embodiment of FIG. 13, the intermediate node 1303 comprises a processing unit 301 for processing the traffic flow. The processing unit 301 may comprise, for example, one or more baseband processing units (BBUs) for performing MAC level processing, and one or more digital units (DUs).

In the embodiment of FIG. 13, the intermediate node 1303 comprises a splitter module 701 configured to duplicate all traffic flows received from the at least one remote access node 201 and send one copy of said traffic flows to the central hub node 202, and input one copy of said traffic flows to the processing unit 301 for processing.

The intermediate node 1303 of FIG. 13 may be configured to input all traffic flows received from the central hub into the processing unit 301, wherein the processing unit 301 is configured to process the traffic flow for a traffic flow associated with one of the at least one remote access node 201 having a responsiveness requirement, and wherein the processing unit 301 is configured not to process the traffic flow for a traffic flow associated with one of the at least one remote access node 201 not having a responsiveness requirement.

Figure 14:
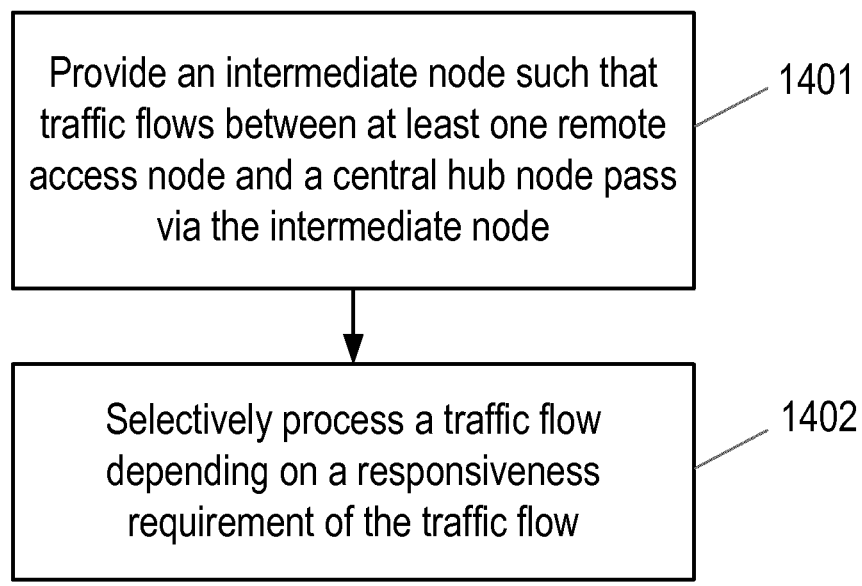
FIG. 14 shows an example of a method at an intermediate node according to an embodiment.

FIG. 14 illustrates a method of processing in an intermediate node, according to an embodiment.

In step 1401 an intermediate node is provided such that traffic flows between at least one remote access node and a central hub node pass via the intermediate node.

In step 1402, a traffic flow is selectively processed in the intermediate node depending on a responsiveness requirement of the traffic flow.

The embodiments described above have the advantage of allowing centralization, even in the presence of latency critical services, i.e. ones having responsiveness requirements.

The embodiments also allow wavelengths to be shared among different radio architectures, without cutting down the maximum distance to the most latency-critical interface.

Some examples also allow the reuse of optical bandwidth between an intermediate node to a central hub.

Furthermore, some examples allow a backup to be provided for baseband processing between an intermediate node and a central node, which may also be useful for maintenance or rolling out upgrades. Such a backup may also comprise its own intermediate node.

The examples of the intermediate nodes described herein may also be shared between multiple rings, for example multiple tangent rings.

The embodiments comprising an optical splitter enable a low cost option to be provided, which in some applications can be more cost effective than embodiments having a switching module.

It is noted that in the embodiments described above, according to some examples an intermediate node can be further adapted such that, in addition to selectively processing traffic flows having a responsiveness requirement, an intermediate node may also be configured to process at least some traffic flows that do not have a responsiveness requirement. In other words, an intermediate node may be configured to process at least some traffic that does not have responsiveness requirements. In some embodiments, an intermediate node is configured to process all traffic flows that the intermediate node receives and that the intermediate node has capacity to process. In such an embodiment an intermediate node can process all traffic flows if the intermediate node has capacity to do so, and only give them away for processing at a central hub node if the capacity of the intermediate node is insufficient and/or a traffic flow does not have a responsiveness requirement.

Thus, in effect, it is noted that in the embodiments described above, in addition to an intermediate node being able to selectively process traffic flows passing through the intermediate node according to a latency requirement of a traffic flow, it is noted that an intermediate node can also be configured to provide load sharing with another node, such as a central hub. In such embodiments, one or more processing operations to be performed at a central hub may be assigned to an intermediate node for processing.

The transport network described in the embodiments above is scalable. For example, the architecture at two stages (for example a remote node and central hub node) can be upgraded by later adding a third node, e.g. a further intermediate node. In addition, future advances in optical technologies can be exploited by simply replacing the optical module at the intermediate node, for example to scale from one switching speed (e.g. 10 Gbps) to a second switching speed (e.g. 100 Gbps).

Further, as mentioned earlier, the embodiments are suitable for use with Elastic RAN architectures.

References to traffic flows from an access node may be replaced by references to traffic flows from a UE or wireless terminal.

It should be noted that the above-mentioned embodiments illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. An intermediate node for a transport network, the intermediate node comprising:
   one or more digital communication interfaces configured to pass traffic flows between at least one remote access node and a central hub node via the intermediate node, wherein traffic flows are carried on one or more first optical channels between the at least one remote access node and the intermediate node, and the traffic flows are carried on one or more second optical channels between the central hub node and the intermediate node; and
   a baseband processing unit configured to:
      selectively baseband process each traffic flow, passed by the digital communication interfaces, when a latency requirement of the traffic flow requires baseband processing in the intermediate node; and
      bypass the traffic flow for baseband processing in the central hub when a latency requirement of the traffic flow does not require baseband processing in the intermediate node,
   wherein the intermediate node is configured to a re-use an optical channel for a traffic flow between the at least one remote access node and the intermediate node and for a baseband processed traffic flow between the central hub node and the intermediate node.

2. The intermediate node of claim 1, wherein the baseband processing unit is further configured to selectively process the traffic flow depending on whether the latency requirement of the traffic flow requires that a distance between nodes in the transport network is less than a distance between said at least one remote access node and the central hub node.

3. The intermediate node of claim 1, wherein the baseband processing unit is configured to process a traffic flow at a medium access control (MAC) level.

4. The intermediate node of claim 1, further comprising a switch selectively configured to input a traffic flow into the baseband processing unit based on the first part of the traffic flow having a latency requirement, wherein the traffic flow including the first and second parts is associated with the at least one remote access node or a wireless terminal.

5. The intermediate node of claim 4, wherein the switch is selectively configured to bypass the baseband processing unit based on any of the following conditions:
the traffic flow associated with the at least one remote access node or wireless terminal does not have a latency requirement; and
the traffic flow associated with the at least one remote access node or wireless terminal has a latency requirement in which a distance between nodes in the transport network is greater than or equal to a distance between said one of the at least one remote access node and the central hub node.

6. The intermediate node of claim 1, further comprising a splitter configured to:
duplicate all traffic flows received from the at least one remote access node;
send a first copy of said duplicate traffic flows to the central hub node; and
input a second copy of said duplicate traffic flows to the baseband processing unit for baseband processing.

7. The intermediate node of claim 6, wherein:
the intermediate node is configured to input all traffic flows received from the central hub into the baseband processing unit; and
the baseband processing unit is configured to:
process a traffic flow, associated with one of the at least one remote access node, that has a latency requirement; and
not process a traffic flow, associated with one of the at least one remote access node, that does not have a latency requirement.

8. The intermediate node of claim 1, wherein the baseband processing unit is further configured to:
process at least some traffic flows that do not have a latency requirement; or
process all traffic flows passing through the intermediate node if the intermediate node has capacity to do so.

9. The intermediate node of claim 1, wherein the intermediate node is part of a remote access node.

10. A transport network for communicating traffic flows having different latency requirements, the transport network comprising:
at least one remote access node;
a central hub node configured for baseband processing; and
a first intermediate node,
wherein the at least one remote access node and the central hub node are connected to transmit traffic flows between the at least one remote access node and the central hub node via the first intermediate node,
wherein traffic flows are carried on one or more optical channels between the remote access node and the intermediate node, and the traffic flows are carried on one or more optical channels between the central hub node and the intermediate node, and wherein the first intermediate node is configured to:
selectively baseband process each traffic flow when a latency requirement of the traffic flow requires baseband processing in the intermediate node,
bypass the traffic flow for baseband processing in the central hub when a latency requirement of the traffic flow does not require baseband processing in the intermediate node, and
re-use an optical channel for a traffic flow between the at least one remote access node and the intermediate node and for a baseband processed traffic flow between the central hub node and the intermediate node.

11. The transport network of claim 10 wherein the central hub is configured to:
discard the traffic flow for an unprocessed traffic flow associated with one of the at least one remote access node having a latency requirement, and
process the traffic flow for a traffic flow associated with one of the at least one remote access node not having a latency requirement.

12. The transport network of claim 11, wherein the first intermediate node comprises:
a baseband processing unit configured to selectively process a traffic flow depending on a latency requirement of the traffic flow; and
a switch selectively configured to input a traffic flow into the baseband processing unit based on the first part of the traffic flow having a latency requirement, wherein the traffic flow including the first and second parts is associated with the at least one remote access node or a wireless terminal.

13. A transport network of claim 11, wherein the first intermediate node comprises:
a baseband processing unit configured to selectively process a traffic flow depending on a latency requirement of the traffic flow; and
a splitter configured to:
duplicate all traffic flows received from the at least one remote access node;
send a first copy of said duplicate traffic flows to the central hub node; and
input a second copy of said duplicate traffic flows to the baseband processing unit for processing.

14. The transport network of claim 10, wherein:
one or more of the remote access nodes form part of a first ring;
one or more of the remote access nodes form part of a second ring; and
the first intermediate node is part of both the first ring and the second ring.

15. The transport network of claim 10, further comprising a second intermediate node connected between the at least one remote access node and the central hub node in parallel with the first intermediate node.

16. The transport network of claim 10, wherein the latency requirement of each particular traffic flow depends on a type associated with the particular traffic flow.

17. The transport network of claim 10, wherein the traffic flows comprise one of the following: common public radio interface (CPRI) traffic, or packet radio data.

18. A central hub node for a transport network comprising at least one remote access node and an intermediate node connected to the central hub node, the central hub node comprising:
- one or more interfaces configured to transmit traffic flows between at least one remote access node and the central hub node via an intermediate node, wherein:
  - the traffic flows are carried on one or more first optical channels between the at least one remote access node and the intermediate node,
  - the traffic flows are carried on one or more second optical channels between the central hub node and the intermedia node, and
  - the intermediate node is configured to a re-use an optical channel for a traffic flow between the at least one remote access node and the intermediate node and for a baseband processed traffic flow between the central hub node and the intermediate node; and
- a baseband processing unit configured to:
  - discard a received traffic flow associated with one of the at least one remote access node or with a wireless terminal, the traffic flow having a latency requirement requiring processing by the intermediate node, and
  - baseband process a received traffic flow for a traffic flow associated with one of the at least one remote access node or the wireless terminal which is bypassed by the intermediate node not having a latency requirement requiring processing by the intermediate node.

19. A method for a transport network comprising at least one remote access node, a central hub node, and a first intermediate node, the method comprising:
- transmitting traffic flows between the at least one remote access node and the central hub node via the first intermediate node, wherein traffic flows are carried on one or more optical channel between the remote access node and the intermediate node, and the traffic flows are carried on one or more optical channel between the central hub node and the intermediate node;
- at the intermediate node, selectively baseband processing each traffic flow when a latency requirement of the traffic flow requires baseband processing in the intermediate node, and bypassing the traffic flow for baseband processing in the central hub when a latency requirement of the traffic flow does not require baseband processing in the intermediate node;
- at the central hub, discarding each traffic flow having a latency requirement that requires processing by the intermediate node, and baseband processing each traffic flow that is bypassed by the intermediate node; and
- at the intermediate node, re-using an optical channel for a traffic flow between the at least one remote access node and the intermediate node and for a baseband processed traffic flow between the central hub node and the intermediate node.

* * * * *